(12) United States Patent
Peng et al.

(10) Patent No.: US 11,947,148 B2
(45) Date of Patent: Apr. 2, 2024

(54) TRANSPARENT DISPLAY PANEL AND ELECTRONIC DEVICE

(71) Applicant: BOE TECHNOLOGY GROUP CO., LTD., Beijing (CN)

(72) Inventors: Yidan Peng, Beijing (CN); Nanfang Jia, Beijing (CN); Long Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 112 days.

(21) Appl. No.: 17/754,136

(22) PCT Filed: Apr. 25, 2021

(86) PCT No.: PCT/CN2021/089597
§ 371 (c)(1),
(2) Date: Mar. 24, 2022

(87) PCT Pub. No.: WO2021/258843
PCT Pub. Date: Dec. 30, 2021

(65) Prior Publication Data
US 2022/0291438 A1    Sep. 15, 2022

(30) Foreign Application Priority Data

Jun. 23, 2020   (CN) .......................... 202010583464.5

(51) Int. Cl.
*F21V 8/00*    (2006.01)
*G02F 1/1333*    (2006.01)
(Continued)

(52) U.S. Cl.
CPC ......... *G02B 6/0028* (2013.01); *G02B 6/0068* (2013.01); *G02B 6/0088* (2013.01);
(Continued)

(58) Field of Classification Search
CPC .... G02B 6/009; G02B 6/0068; G02B 6/0028; G02B 6/0073; G02F 1/133302;
(Continued)

(56) References Cited

U.S. PATENT DOCUMENTS

| 11,035,995 B2 | 6/2021 | Okuyama et al. |
| 2001/0004275 A1* | 6/2001 | Umemoto ......... G02F 1/133615 349/65 |

(Continued)

FOREIGN PATENT DOCUMENTS

| CN | 102434824 A | 5/2012 |
| CN | 103257391 A | 8/2013 |

(Continued)

OTHER PUBLICATIONS

English Translation of International Search Report dated Jul. 21, 2021, for corresponding PCT Application No. PCT/CN2021/089597.

*Primary Examiner* — Hoan C Nguyen
(74) *Attorney, Agent, or Firm* — Kinney & Lange, P.A.

(57) ABSTRACT

A transparent display panel and an electronic device are provided. The transparent display panel includes: a first substrate, a second substrate, and a liquid crystal layer therebetween, the second substrate having an edge extension portion located on a same side of the transparent display panel as a first light incident surface of the first substrate; a first light source assembly located on a side, where the first light incident surface is provided, of the first substrate; a first light guide bar located between the first light source assembly and the first light incident surface, the first light guide bar having a first light guide bar surface, a second light guide bar surface, and a first light guide bar slope surface therebetween, an inner angle formed between the first light guide (Continued)

bar slope surface and the second light guide bar surface being less than or equal to 90 degrees.

19 Claims, 16 Drawing Sheets

(51) Int. Cl.
G02F 1/1334 (2006.01)
G02F 1/1337 (2006.01)
G02F 1/1339 (2006.01)
G02F 1/1343 (2006.01)

(52) U.S. Cl.
CPC ....... G02B 6/009 (2013.01); G02F 1/133308 (2013.01); G02F 1/1334 (2013.01); G02F 1/1337 (2013.01); G02F 1/1339 (2013.01); G02F 1/134309 (2013.01); G02F 2203/01 (2013.01); G02F 2203/03 (2013.01)

(58) Field of Classification Search
CPC ............. G02F 1/133308; G02F 1/1339; G02F 1/1337; G02F 1/134309; G02F 1/1334; G02F 1/133615; G02F 2203/03; G02F 2203/01
See application file for complete search history.

(56) References Cited

U.S. PATENT DOCUMENTS

| | | | |
|---|---|---|---|
| 2004/0042233 A1* | 3/2004 | Suzuki | G02B 6/0038 362/606 |
| 2004/0109306 A1* | 6/2004 | Lee | G02B 6/002 385/146 |
| 2005/0068473 A1* | 3/2005 | Kim | G02B 6/0055 349/65 |
| 2008/0225506 A1* | 9/2008 | Huang | G02B 6/0056 362/19 |
| 2010/0048085 A1* | 2/2010 | Kayanuma | G02B 6/0028 445/23 |
| 2015/0192727 A1 | 7/2015 | Kuo et al. | |
| 2017/0168207 A1* | 6/2017 | Liu | G02B 6/002 |
| 2017/0192147 A1 | 7/2017 | Ha et al. | |
| 2017/0269433 A1 | 9/2017 | Sugiyama et al. | |
| 2019/0302343 A1 | 10/2019 | Okuyama et al. | |

FOREIGN PATENT DOCUMENTS

| | | |
|---|---|---|
| CN | 103941472 A | 7/2014 |
| CN | 104793283 A | 7/2015 |
| CN | 106707616 A | 5/2017 |
| CN | 206234698 U | 6/2017 |
| CN | 111290069 A | 6/2020 |
| CN | 212160286 U | 12/2020 |
| JP | 2019174530 A | 10/2019 |
| KR | 20140067471 A | 6/2014 |
| KR | 20150074828 A | 7/2015 |

* cited by examiner

TRANSPARENT DISPLAY PANEL AND ELECTRONIC DEVICE

CROSS REFERENCE TO RELATED APPLICATION(S)

This application is a Section 371 National Stage Application of International Application No. PCT/CN2021/089597, filed on Apr. 25, 2021, entitled "TRANSPARENT DISPLAY PANEL AND ELECTRONIC DEVICE", which claims priority to Chinese Patent Application No. 2020105834645, filed on Jun. 23, 2020, the content of which are incorporated herein by reference in their entirety.

TECHNICAL FIELD

The present disclosure relates to a field of a display technology, in particular to a transparent display panel and an electronic device including the transparent display panel.

BACKGROUND

Transparent display is a widely required technology, which may be used in vehicle display, window display, home display, wearable display, and other applications that need to display an image and make a scene behind a screen visible. The transparent display may be achieved by means of a liquid crystal layer in a form of a composite film layer of polymer and liquid crystal, such as polymer network stabilized liquid crystal (PSLC) or polymer dispersed liquid crystal (PDLC). When a transparent display screen needs to display, a voltage may be applied to a display region in which the liquid crystal layer is located to deflect the liquid crystal to scatter light, so as to achieve a display function. When the screen does not need to display, no voltage is applied on either side of the liquid crystal layer. Such panel generally includes a structure of two substrates and a liquid crystal layer sandwiched between the two substrates.

SUMMARY

The embodiments of the present disclosure provide a transparent display panel, including: a first substrate, a second substrate, and a liquid crystal layer located between the first substrate and the second substrate, wherein the first substrate has a first display surface away from the second substrate, a first surface facing the second substrate, and a first light incident surface located between the first display surface and the first surface, the second substrate has an edge extension portion located on a same side of the transparent display panel as the first light incident surface of the first substrate, and an orthographic projection of the first substrate on a surface, facing the first substrate, of the second substrate does not overlap the edge extension portion, wherein the transparent display panel further includes: a first light source assembly located on a side, where the first light incident surface is located, of the first substrate; a second light source assembly located on another side opposite to the side of the first substrate where the first light source assembly is located; and a first light guide bar located between the first light source assembly and the first light incident surface, wherein the first light guide bar has a first light guide bar surface facing the first light incident surface, a second light guide bar surface away from the first light incident surface, and a first light guide bar slope surface located between the first light guide bar surface and the second light guide bar surface, and an inner angle formed between the first light guide bar slope surface and the second light guide bar surface is less than or equal to 90 degrees.

In some embodiments, the transparent display panel further includes a fixing frame configured to fix the first light guide bar to the first substrate and the second substrate, wherein the fixing frame includes a positioning surface matched with the first light guide bar slope surface of the first light guide bar, and the positioning surface and the first light guide bar slope surface are inclined surfaces having a same inclination angle.

In some embodiments, the fixing frame further includes a light source fixing portion configured to fix the first light source assembly, the light source fixing portion is provided with a groove configured to accommodate the first light source assembly, and the groove is arranged to face the second light guide bar surface of the first light guide bar.

In some embodiments, an area of the second light guide bar surface is greater than an area of the first light guide bar surface.

In some embodiments, the first light guide bar has a third light guide bar surface facing the second substrate, and the second substrate has a second light incident surface facing the third light guide bar surface for receiving a light exited from the third light guide bar surface.

In some embodiments, the first light guide bar surface is in contact with the first light incident surface of the first substrate, a chip-on-glass encapsulation and a chip-on-film encapsulation are provided on the second light incident surface, wherein the third light guide bar surface is in contact with the chip-on-glass encapsulation on the second light incident surface of the second substrate.

In some embodiments, the transparent display panel further includes a sealant located between the first substrate and the second substrate and on a periphery of the liquid crystal layer for sealing the liquid crystal layer, wherein a gap is provided between the first light guide bar surface and the sealant.

In some embodiments, a distance between the first light guide bar surface and the second light guide bar surface is equal to a length difference between the second substrate and the first substrate in a direction perpendicular to the first light incident surface.

In some embodiments, a width of the first light guide bar surface in a direction perpendicular to the first display surface of the first substrate is less than or equal to a thickness sum of the first substrate and the liquid crystal layer in the direction perpendicular to the first display surface of the first substrate.

In some embodiments, the first light source assembly is arranged to face the second light guide bar surface of the first light guide bar, and a width of the first light source assembly in a direction perpendicular to the first display surface of the first substrate is less than or equal to that of the second light guide bar surface in the direction perpendicular to the first display surface of the first substrate.

In some embodiments, the inner angle formed between the first light guide bar slope surface and the second light guide bar surface is greater than 70 degrees.

In some embodiments, the inner angle formed between the first light guide bar slope surface and the second light guide bar surface is greater than 84.5 degrees.

In some embodiments, the first substrate further includes a third light incident surface arranged on a side of the first substrate opposite to the side of the first substrate where the first light incident surface is located, and the second substrate further includes a fourth light incident surface located on a same side of the transparent display panel as the third light incident surface; and the second light source assembly is arranged on the same side of the transparent display panel as the third light incident surface and the fourth light incident surface; wherein the transparent display panel further includes: a second light guide bar located on a side of the second light source assembly facing the third light incident surface and the fourth light incident surface and on a side of the third light incident surface and the fourth light incident surface facing the second light source assembly, wherein the second light guide bar has a fourth light guide bar surface facing the third light incident surface and the fourth light incident surface, a fifth light guide bar surface away from the third light incident surface and the fourth light incident surface, and a second light guide bar slope surface located between the fourth light guide bar surface and the fifth light guide bar surface, and an inner angle formed between the second light guide bar slope surface and the fifth light guide bar surface is less than or equal to 90 degrees.

In some embodiments, a width of the fourth light guide bar surface in a direction perpendicular to the first display surface is less than or equal to a thickness sum of the first substrate, the second substrate and the liquid crystal layer in the direction perpendicular to the first display surface.

In some embodiments, the fourth light guide bar surface is in contact with the third light incident surface and the fourth light incident surface.

In some embodiments, a width of the second light source assembly in a direction perpendicular to the first display surface is greater than a thickness sum of the first substrate, the second substrate and the liquid crystal layer in the direction perpendicular to the first display surface and less than or equal to a width of the fifth light guide bar surface in the direction perpendicular to the first display surface.

In some embodiments, the first light guide bar, the second light guide bar, the first substrate and the second substrate have a same refractive index.

In some embodiments, at least one of the first light source assembly or the second light source assembly includes: a carrier board; and a plurality of light emitting diode chips including light emitting diode chips having a plurality of colors arranged on a side of the carrier board facing the first substrate.

In some embodiments, a gap with a size in a range of 0.5 mm to 2 mm is provided between the first light source assembly and the second light guide bar surface of the first light guide bar, and a gap with a size in a range of 0.5 mm to 2 mm is provided between the second light source assembly and the fifth light guide bar surface of the second light guide bar.

In some embodiments, the transparent display panel further includes: a first electrode layer located between the liquid crystal layer and the first substrate in a direction perpendicular to the first display surface; a second electrode layer located between the liquid crystal layer and the second substrate in the direction perpendicular to the first display surface; a first alignment layer located on a side of the liquid crystal layer facing the first electrode layer; and a second alignment layer located on a side of the liquid crystal layer facing the second electrode layer, wherein the first electrode layer and the second electrode layer are configured to control the liquid crystal layer to switch between a light transmission state and at least one light scattering state.

In some embodiments, the inner angle formed between the second light guide bar slope surface and the fifth light guide bar surface is greater than 84.5 degrees.

The embodiments of the present disclosure provide a transparent display panel, including: a first substrate and a second substrate; a liquid crystal layer located between the first substrate and the second substrate; a light guide plate located on a side of the first substrate or the second substrate away from the liquid crystal layer, wherein the light guide plate has a first light guide plate surface away from the liquid crystal layer, a second light guide plate surface facing the liquid crystal layer, and a fifth light incident surface located between the first light guide plate surface and the second light guide plate surface; a first light source assembly located on a side, where the fifth light incident surface is located, of the light guide plate; and a first light guide bar located between the first light source assembly and the fifth light incident surface, wherein the first light guide bar has a first light guide bar surface facing the fifth light incident surface, a second light guide bar surface away from the fifth light incident surface, and a first light guide bar slope surface located between the first light guide bar surface and the second light guide bar surface, and an inner angle formed between the first light guide bar slope surface and the second light guide bar surface is less than or equal to 90 degrees.

In some embodiments, the transparent display panel further includes a refractive index matching layer arranged on a surface of the light guide plate facing the liquid crystal layer, wherein a refractive index of the refractive index matching layer is less than that of the light guide plate, that of the first substrate and that of the second substrate.

In some embodiments, the transparent display panel further includes a fixing frame configured to fix the first light guide bar, wherein the fixing frame includes a positioning surface matched with the first light guide bar slope surface of the first light guide bar, and the positioning surface and the first light guide bar slope surface are inclined surfaces having a same inclination angle.

In some embodiments, the fixing frame further includes a light source fixing portion configured to fix the first light source assembly, the light source fixing portion is provided with a groove configured to accommodate the first light source assembly, and the groove is arranged to face the second light guide bar surface of the first light guide bar.

In some embodiments, the second substrate has an edge extension portion located on the same side of the transparent display panel as the first light source assembly, and an orthographic projection of the first substrate on a surface, facing the first substrate, of the second substrate does not overlap the edge extension portion.

In some embodiments, the light guide plate is located on a side of the first substrate away from the liquid crystal layer, and a width of the first light guide bar surface in a direction perpendicular to the first light guide plate surface is equal to or greater than a thickness of the light guide plate.

In some embodiments, a width of the first light guide bar surface in the direction perpendicular to the first light guide plate surface is equal to a thickness sum of the light guide plate, the refractive index matching layer, the first substrate, and the liquid crystal layer.

In some embodiments, the light guide plate is located on a side of the second substrate away from the liquid crystal layer, and a width of the first light guide bar surface in the direction perpendicular to the first light guide plate surface is equal to or greater than the thickness of the light guide plate.

In some embodiments, the width of the first light guide bar surface in the direction perpendicular to the first light guide plate surface is equal to a thickness sum of the light guide plate, the refractive index matching layer and the second substrate.

In some embodiments, the first light guide bar further includes a third light guide bar surface on a side opposite to a side where the first light guide bar slope surface is located, and an inner angle formed between the third light guide bar surface and the second light guide bar surface is less than or equal to 90 degrees.

In some embodiments, an area of the second light guide bar surface is greater than that of the first light guide bar surface.

The embodiments of the present disclosure further provide an electronic device including the transparent display panel described in any one of the above embodiments.

BRIEF DESCRIPTION OF THE DRAWINGS

In order to more clearly illustrate the technical solutions in the embodiments of the present disclosure, the accompanying drawings which show the embodiments will be briefly illustrated below. It should be noted that the accompanying drawings described below involve only some embodiments of the present disclosure, and are not intended to limit the present disclosure, in which.

DETAILED DESCRIPTION OF EMBODIMENTS

In order to more clearly illustrate objectives, technical solutions and advantages of the present disclosure, the embodiments of the present disclosure will be described hereinafter with reference to the accompanying drawings. It should be understood that the following description of the embodiments is intended to explain and illustrate a general idea of the present disclosure, and should not be construed as limiting the present disclosure. In the specification and the accompanying drawings, the same or similar reference signs indicate the same or similar components or members. For clarity, the accompanying drawings are not necessarily drawn in scale, and some known components and structures may be omitted in the accompanying drawings.

Unless otherwise defined, technical terms or scientific terms used in the present disclosure shall be of the general meaning understood by those of ordinary skilled in the art. Terms "first," "second," and the like used in the present disclosure do not represent any order, quantity or importance, but are used to distinguish different components. Terms "a", "an" or "one" do not exclude a plurality. Term "comprising," "including" or the like indicates that an element or item preceding the term encompasses an element or item listed following the term as well as an equivalent thereof, but do not exclude other elements or items. Term "connected," "coupled," or the like is not limited to a physical or mechanical connection, but may include an electrical connection, whether direct or indirect. Terms "upper", "lower", "left", "right", "top" or "bottom" and the like are only used to indicate a relative positional relationship, and when an absolute position of an object described is changed, the relative positional relationship may also be changed accordingly. When an element such as a layer, a film, an area or a base substrate is referred to be located "on" or "under" another element, the element may be "directly" located "on" or "under" the another element, or the element and the another element have an intermediate element therebetween.

Figure 1:
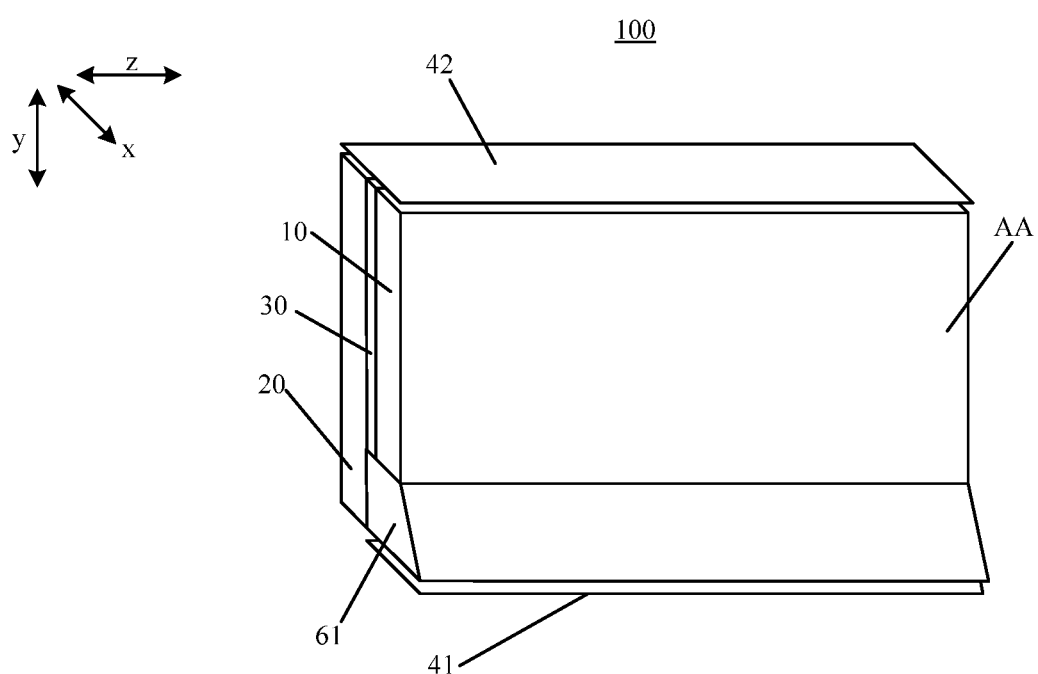
FIG. 1 shows a schematic perspective view of a transparent display panel according to some embodiments of the present disclosure.
Figure 2:
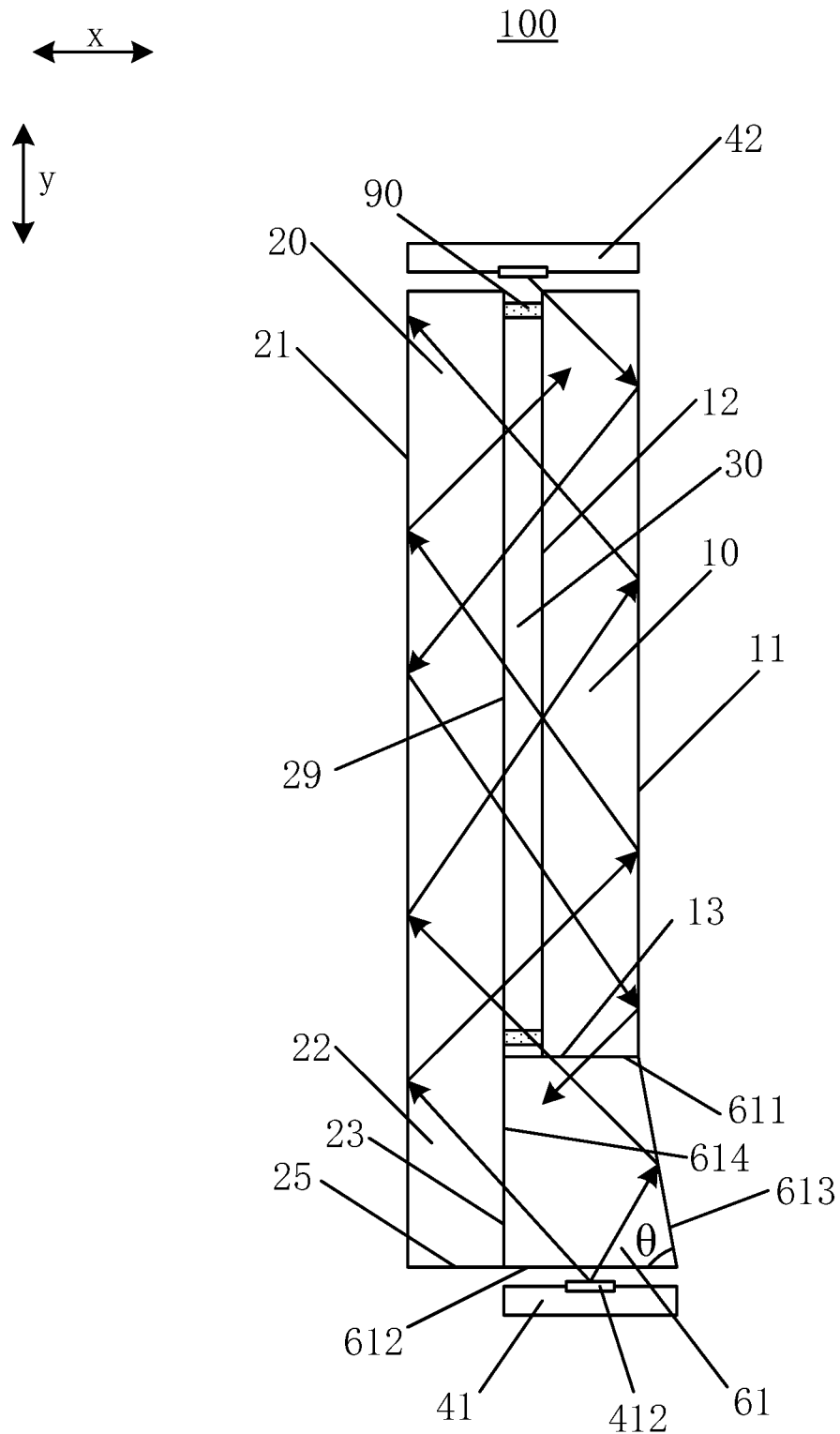
FIG. 2 shows a schematic side view of the transparent display panel shown in FIG. 1.

Embodiments of the present disclosure provide a transparent display panel 100. As shown in FIG. 1 and FIG. 2, the transparent display panel 100 includes a first substrate 10, a second substrate 20, and a liquid crystal layer 30 located between the first substrate 10 and the second substrate 20. The first substrate 10 has a first display surface 11 away from the second substrate 20, a first surface 12 facing the second substrate 20, and a first light incident surface 13 located between the first display surface 11 and the first surface 12.

The transparent display panel is different from a liquid crystal display panel used on a conventional liquid crystal display. For the conventional liquid crystal display panel, a voltage is applied to a liquid crystal layer by an electrode to change an influence of the liquid crystal layer on a polarization direction of polarized light, and a state of an emitted polarized light is detected by an analyzer (generally formed by a polaroid) located on a light exit side of the liquid crystal layer (polarized lights with different polarization directions correspond to different transmittances of the analyzer), so as to achieve an image display. Therefore, in the conventional liquid crystal display, polaroids on both sides of the liquid crystal layer (one is a polarizer and the other is an analyzer) are essential components.

The transparent display panel 100 according to the present disclosure is provided in a form of including an edge-type light source. As shown in FIG. 2, light source assemblies (for example, including a first light source assembly 41 and a second light source assembly 42) are respectively arranged on upper and lower sides of the transparent display panel 100. A combination of the first substrate 10 (for example, a cover substrate arranged opposite to an array substrate) and the second substrate 20 (for example, the array substrate) may be regarded as similar to a light guide. A light emitted from the light source assemblies may enter the first substrate 10 or the second substrate 20 and then may be reflected back and forth between the first display surface 11 of the first substrate 10 and a surface of the second substrate 20 away from the first substrate 10 (hereinafter referred to as a second surface 21). In order to improve an optical efficiency, an incident angle of most of the light entering the first substrate 10 or the second substrate 20 at the first display surface 11 of the first substrate 10 and the second surface 21 of the second substrate 20 may be greater than a total reflection threshold angle so as to achieve a total reflection. Under an action of a voltage, the liquid crystal layer 30 may achieve a transmission state and at least one scattering state. In the transmission state, the light may pass through the liquid crystal layer 30, so that the light may totally reflected back and forth between the first display surface 11 of the first substrate 10 and the second surface 21 of the second substrate 20 after passing through the liquid crystal layer 30. In the scattering state, the light may be scattered by the liquid crystal layer 30 so that a traveling direction of the light is changed. Then, after the light passes through the liquid crystal layer 30 in the scattering state, a fair amount of light may not meet a total reflection condition at the first display surface 11 of the first substrate 10 and the second surface 21 of the second substrate 20 and thus may exit from the first substrate 10 or the second substrate 20. The liquid crystal layer 30 may contain, for example, a polymer network stabilized liquid crystal. It should be noted that although two light source assemblies are shown in FIG. 1, the embodiments of the present disclosure are not limited thereto. For example, the transparent display panel 100 may have only one light source assembly, such as the first light source assembly 41. In the embodiments of the present disclosure, the first display surface 11 is a main display surface for displaying an image, but the image may also be observed from the second surface 21 of the second substrate 20.

In some embodiments, the liquid crystal layer 30 may be in a form of a composite film layer of polymer and liquid crystal, for example, made of a polymer network stabilized liquid crystal (PSLC) material or a polymer dispersed liquid crystal (PDLC) material. The polymer network stabilized liquid crystal material is an optoelectronic composite material in which a small amount of polymer forms a network to stabilize a liquid crystal orientation. Different orientations of liquid crystal molecules in the polymer network may cause a change in a refractive index. When no electric field is applied, the polymer network stabilized liquid crystal material is in a transparent state (that is, a light transmission state), while after an appropriate electric field is applied, an anchoring action between the polymer network and the liquid crystal may limit a reorientation of some liquid crystals in the electric field, so that the liquid crystal molecules are disorderly arranged and have different refractive indices to scatter the incident light (that is, the polymer network stabilized liquid crystal material is in a light scattering state). The above-mentioned properties of the polymer network stabilized liquid crystal material may be applied for the liquid crystal layer 30 to display an image.

As an example, a liquid crystal assembly based on the polymer network stabilized liquid crystal material may form a polymer network by ultraviolet irradiation after filling general liquid crystal molecules and polymerizable liquid crystal monomers into a liquid crystal cell. Affected by the polymer network, a response speed of the liquid crystal may reach, for example, about 1 millisecond.

The polymer dispersed liquid crystal (PDLC) material is formed by dispersing liquid crystals in a form of droplets (e.g., micron-sized droplets) in an organic solid polymer matrix. Specifically, the liquid crystal layer 30 in the form of a polymer film layer made of PDLC may be, for example, prepared by dispersing liquid crystals in the form of droplets in which the liquid crystal molecules are arranged with disorder optical axis orientations in the organic solid polymer matrix contained in the liquid crystal layer. Moreover, since respective optical axes of the droplets composed of liquid crystal molecules are in free orientation or random orientation when no electric field is applied, a refractive index of the liquid crystal molecules does not match that of the polymer matrix, which may result in that the light incident into the polymer dispersed liquid crystal material is scattered in various directions by the droplets dispersed in the polymer matrix when passing through the polymer matrix, so that the polymer dispersed liquid crystal material is in an opaque state or a translucent state (that is, the light scattering state) to the light incident therein. In a case that an electric field is applied to the polymer dispersed liquid crystal material, the optical axis orientations of the liquid crystal droplets may be adjusted to be oriented along the applied electric field. Then, when the refractive index of the liquid crystal molecules matches that of the polymer matrix, the light incident into the polymer dispersed liquid crystal material may be transmitted through the polymer matrix (rather than scattered by the droplets dispersed in the polymer matrix), so that the polymer dispersed liquid crystal material is in a transparent state (that is, the light transmission state) for the light incident therein. After a removal of the electric field, the liquid crystal droplets may return to be in an original state in which the light incident into the polymer dispersed liquid crystal material is scattered in various directions (in this case, the polymer dispersed liquid crystal material returns to be in the light scattering state). The above-mentioned properties of the polymer dispersed liquid crystal material may be used to control a light intensity transmitted through the PDLC film layer by changing the voltage applied thereon.

Figure 7:
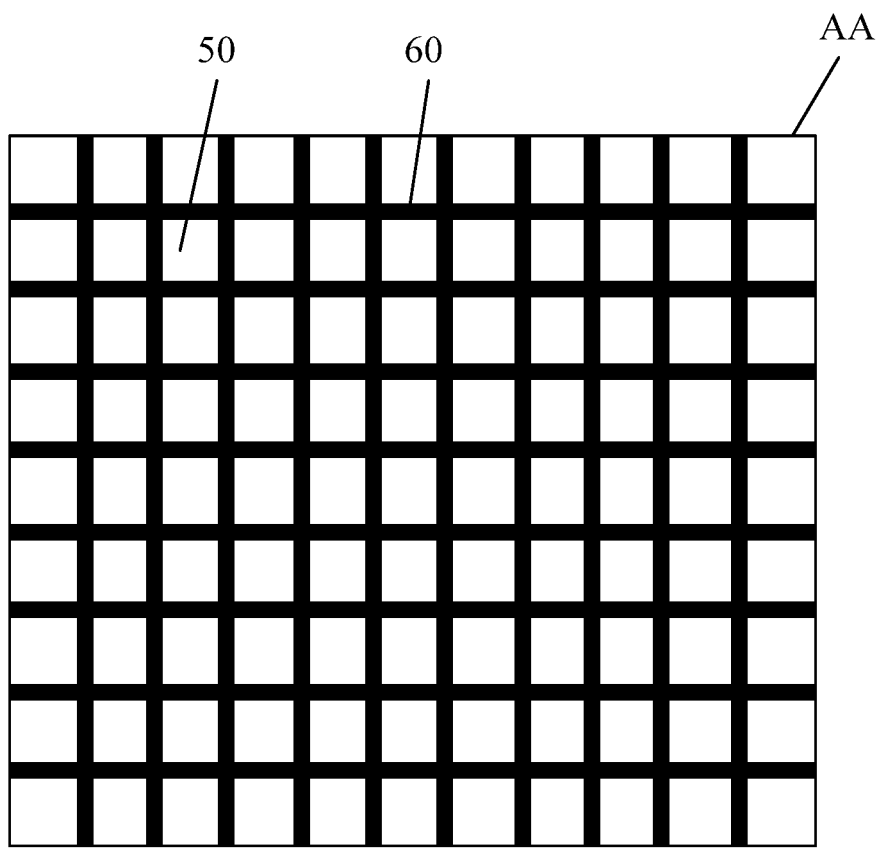
FIG. 7 schematically shows a schematic plan view on a display side of a transparent display panel according to the embodiments of the present disclosure.

FIG. 7 schematically shows a plan view of the transparent display panel 100 observed from the first display surface 11, in which a plurality of pixel units 50 are shown. As described above, by applying different voltages respectively to respective parts of the liquid crystal layer 30 corresponding to the pixel units 50, the respective parts of the liquid crystal layer 30 corresponding to the pixel units 50 may be in different scattering or transmission states, so that the image display may be achieved. As an example, the pixel units 50 may be separated by a black matrix 60. The black matrix 60 may be arranged on a side of the first substrate 10 facing the liquid crystal layer 30 to enhance a contrast of the display image. However, the embodiments of the present disclosure are not limited thereto, and the transparent display panel 100 may not be provided with the black matrix 60.

It should be noted that, in the transparent display panel, the first substrate 10 and the second substrate 20 may have different lengths. For example, in the example shown in FIG. 2, a length of the second substrate 20 in a direction parallel to the first display surface 11 and perpendicular to the light source assembly (e.g., in a y-direction shown in FIG. 2) is greater than that of the first substrate 10 in the same direction. Specifically, the second substrate 20 has an edge extension portion 22 extending beyond the first light incident surface 13 in a direction away from a display region AA of the transparent display panel 100. As shown in FIG. 2, the edge extension portion 22 of the second substrate 20 and the first light incident surface 13 of the first substrate 10 are located on the same side of the transparent display panel 100, and an orthographic projection of the first substrate 10 on a surface 29, facing the first substrate 10, of the second substrate 20 does not overlap the edge extension portion 22. The first light source assembly 41 may be located on a side, where the first light incident surface 13 is located, of the first substrate 10. In this case, if the first light source assembly 41 is directly placed below the first substrate 10 and the second substrate 20, a considerable part of the light emitted from the first light source assembly 41 may fail to enter the first substrate 10 and the second substrate 20, which may result in a low utilization rate of a light energy.

In order to solve the problem described above, in the embodiments of the present disclosure, the transparent display panel 100 is further provided with a first light guide bar 61 located between the first light source assembly 41 and the first light incident surface 13. The first light guide bar 61 has a first light guide bar surface 611 facing the first light incident surface 13, a second light guide bar surface 612 away from the first light incident surface 13, and a first light guide bar slope surface 613 located between the first light guide bar surface 611 and the second light guide bar surface 612. As shown in FIG. 2, an inner angle θ formed between the first light guide bar slope surface 613 and the second light guide bar surface 612 is less than or equal to 90 degrees. That is to say, a cross section of the first light guide bar 61 is a trapezoid. A bottom side of the trapezoid faces the first light source assembly 41 to receive the light emitted from the first light source assembly 41, and a top side of the trapezoid faces the first light incident surface 13 of the first substrate 10 to guide the light to the first substrate 10. It should be noted that the first light guide bar surface 611 and the second light guide bar surface 612 do not need to be absolutely parallel to each other and may be provided according to shapes of the first light incident surface 13 and the first light source assembly 41.

The first light guide bar 61 shaped as described above may achieve a good light coupling efficiency. At least part of the light entering the first light guide bar 61 from the first light guide bar surface 611 may be reflected toward the first substrate 10 or the second substrate 20 by the first light guide bar slope surface 613. In some embodiments, the inner angle θ formed between the first light guide bar slope surface 613 and the second light guide bar surface 612 is greater than 70 degrees. Exemplary values of a center luminance and an overall luminance homogeneity of the display panel with different inner angles θ formed between the first light guide bar slope surface 613 and the second light guide bar surface 612 of the first light guide bar 61 are listed in Table 1, and exemplary values of the central luminance and the overall luminance homogeneity of the display panel without providing the light guide bar are also listed for comparison. The values of the center luminance listed in Table 1 are normalized values, and the larger the value, the higher the center luminance of the display panel. Similarly, the values of the luminance homogeneity listed in Table 1 are also normalized values, and the larger the value, the better the overall luminance homogeneity of the display panel. As shown in Table 1, in a case that the first light guide bar 61 is not provided between the first light source assembly 41 and the first substrate 10, due to the difference in the length of the first substrate 10 and the length of the second substrate 20 in the y-direction, a considerable proportion of the light emitted from the first light source assembly 41 may not be coupled to the first substrate 10, which may result in a lower optical efficiency, so that the display panel has poor center luminance and luminance homogeneity. In a case that the first light guide bar 61 is provided, the first light guide bar 61 may be used to increase a coupling amount of the light emitted by the first light source assembly 41 to the first substrate 10 and the second substrate 20, which may improve the optical coupling efficiency, so that the center luminance and the overall luminance homogeneity of the display panel may be increased.

TABLE 1

|   | Light guide bar is provided | | | | No light guide bar |
|---|---|---|---|---|---|
| θ | 70° | 75° | 80° | 84.5° | |
| Center luminance | 0.32 | 0.43 | 0.63 | 0.89 | 0.25 |
| Luminance homogeneity | 0.31 | 0.43 | 0.64 | 0.89 | 0.17 |

As shown in Table 1, when the inner angle θ formed between the first light guide bar slope surface 613 and the second light guide bar surface 612 gradually increases from 70 degrees, the optical coupling efficiency also increases. Especially when θ reaches 84.5 degrees, the central luminance of the display panel increases by about 3.5 times compared with that without providing the light guide bar, and the luminance homogeneity of the display panel also greatly increases compared with that without providing the light guide bar. In some embodiments, the inner angle θ formed between the first light guide bar slope surface 613 and the second light guide bar surface 612 is greater than 84.5 degrees. The increase of the inner angle θ is beneficial to improve a probability of a total reflection of the light emitted from the first light source assembly 41 at the first light guide bar slope surface 613, so that more light may be totally reflected toward the first substrate 10 and the second substrate 20 to improve the optical coupling efficiency.

In some embodiments, an area of the second light guide bar surface 612 is greater than that of the first light guide bar surface 611. An area of a light receiving surface of the first light guide bar 61 facing the first light source assembly 41 is greater than that of a light output surface of the first light guide bar 61 facing the first substrate 10. In this way, in an aspect, a design of the first light guide bar 61 may be matched to a case that a width of the first light source assembly 41 in a direction perpendicular to the first display surface 11 of the first substrate 10 (x-direction shown in FIG. 2) is greater than a thickness of the first substrate 10. As an example, the width of the first light source assembly 41 (e.g., a light bar) in the x-direction shown in FIG. 2 is in a range of 1.0 mm to 3.0 mm, and the thickness of the first substrate 10 is in a range of, for example, 0.3 mm to 0.7 mm, such as about 0.5 mm; in another aspect, the area of the second light guide bar surface 612 is greater than that of the first light guide bar surface 611, which helps to improve the optical coupling efficiency, so that the first light guide bar 61 may guide more light to the first substrate 10 and the second substrate 20.

Figure 9:
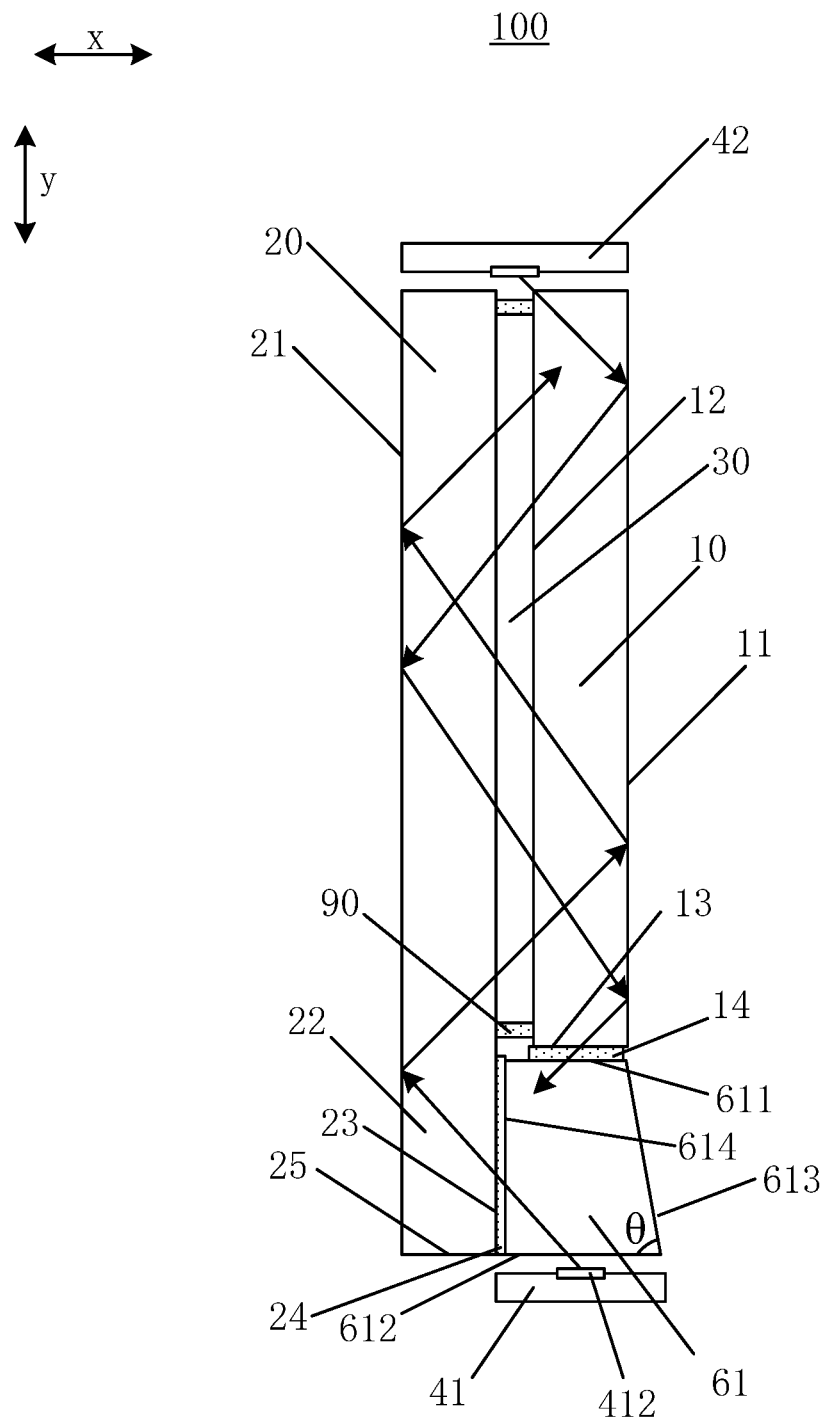
FIG. 9 schematically shows a schematic diagram of a transparent display panel according to other embodiments of the present disclosure.

In some embodiments, the first light guide bar 61 may further have a third light guide bar surface 614 facing the second substrate 20. The second substrate 20 may have a second light incident surface 23 facing the third light guide bar surface 614 to receive the light exited from the third light guide bar surface 614. The first light guide bar 61 is provided with the first light guide bar surface 611 facing the first light incident surface 13 of the first substrate 10 and the third light guide bar surface 614 facing the second light incident surface 23 of the second substrate 20, so that the first light guide bar 61 may efficiently couple the light from the first light source assembly 41 to the first substrate 10 and the second substrate 20. In some embodiments, the first light guide bar surface 611 of the first light guide bar 61 may be in contact with the first light incident surface 13 of the first substrate 10, and the third light guide bar surface 614 of the first light guide bar 61 may be in contact with the second light incident surface 23 of the second substrate 2, which may further facilitate the optical coupling of light from the first light guide bar 61 to the first substrate 10 and the second substrate 20. However, the embodiments of the present disclosure are not limited thereto. For example, as shown in FIG. 9, a first adhesive layer 14 may be provided between the first light guide bar surface 611 and the first light incident surface 13 of the first substrate 10, and a second adhesive layer 24 may be provided between the third light guide bar surface 614 and the second light incident surface 23 of the second substrate 20. That is to say, the first light guide bar surface 611 of the first light guide bar 61 and the first light incident surface 13 of the first substrate 10 are bonded together by the first adhesive layer 14, and the third light guide bar surface 614 of the first light guide bar 61 and the second light incident surface 23 of the second substrate 20 are bonded together by the second adhesive layer 24. As an example, the first adhesive layer 14 and the second adhesive layer 24 may be made of an at least partially transparent optical adhesive.

In some embodiments, when the second substrate 20 is an array substrate and the first substrate 10 is a cover substrate, the second light incident surface 23 is a surface of the edge extension portion 22 of the second substrate 20 close to the first substrate 10. The edge extension portion 22 is located in a non-display region, and some circuit components such as driving circuits, wires and the like may be provided on the second light incident surface 23. These circuit components may be provided, for example, in a chip-on-glass (COG) encapsulation or a chip-on-film (COF) encapsulation. A plurality of COG encapsulations and COF encapsulations (e.g., two COG encapsulations and two COF encapsulations) may be provided on the second light incident surface 23 as required. For example, the COG encapsulation may be used to arrange driving circuit devices, and the COF encapsulation may be used to arrange wiring, etc.

Figure 11:
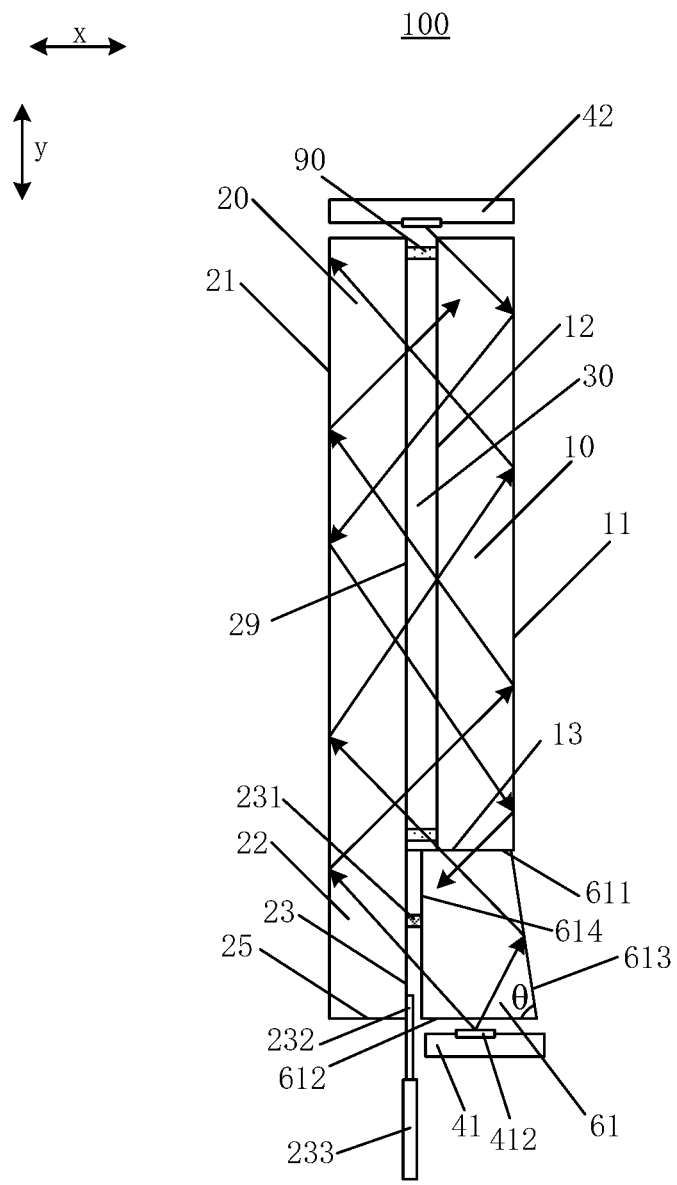
FIG. 11 schematically shows a schematic diagram of a transparent display panel according to other embodiments of the present disclosure.

As an example, as shown in FIG. 11, a COG encapsulation 231 and a COF encapsulation 232 are provided on the second light incident surface 23. The COF encapsulation 232 may be used, for example, to connect to an external printed circuit board (PCB) 233. The COG encapsulation 231 is directly attached to the second light incident surface 23. The COF encapsulation 232 has one end attached to an edge of the second light incident surface 23, and the other end bound to the printed circuit board 233. As shown in FIG. 11, a thickness of the COG encapsulation 231 is greater than that of the COF encapsulation 232. The third light guide bar surface 614 of the first light guide bar 61 is in contact with the COG encapsulation 231 on a side of the COG encapsulation 231 away from the second light incident surface 23, and the third light guide bar surface 614 of the first light guide bar 61 is separated by a gap from the second light incident surface 23 and the COF encapsulation 232. For example, the thickness of the COG encapsulation 231 is about 100 micrometers, and the thickness of the COF encapsulation 232 is about 50 micrometers.

Figure 3:
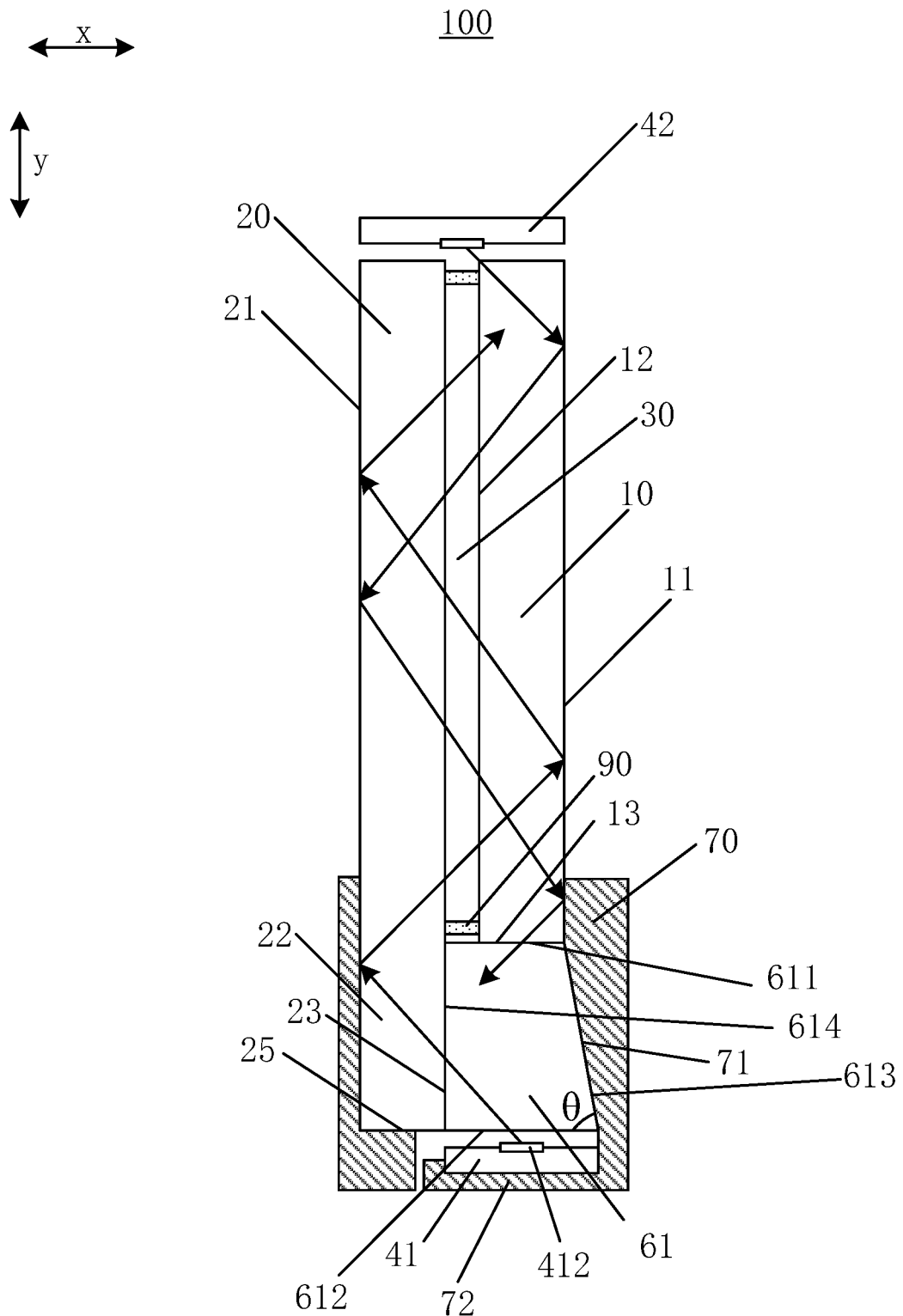
FIG. 3 shows a schematic structural diagram of a transparent display panel according to some embodiments of the present disclosure.

In some embodiments, as shown in FIG. 3, the transparent display panel may be further provided with a sealant 90 located between the first substrate 10 and the second substrate 20 and at a periphery of the liquid crystal layer 30 to seal the liquid crystal layer 30. In practice, a gap may be provided between the first light guide bar surface 611 and the sealant 90, so as to facilitate an assembly of the first light guide bar 61 with the first substrate 10 and the second substrate 20.

Figure 10:
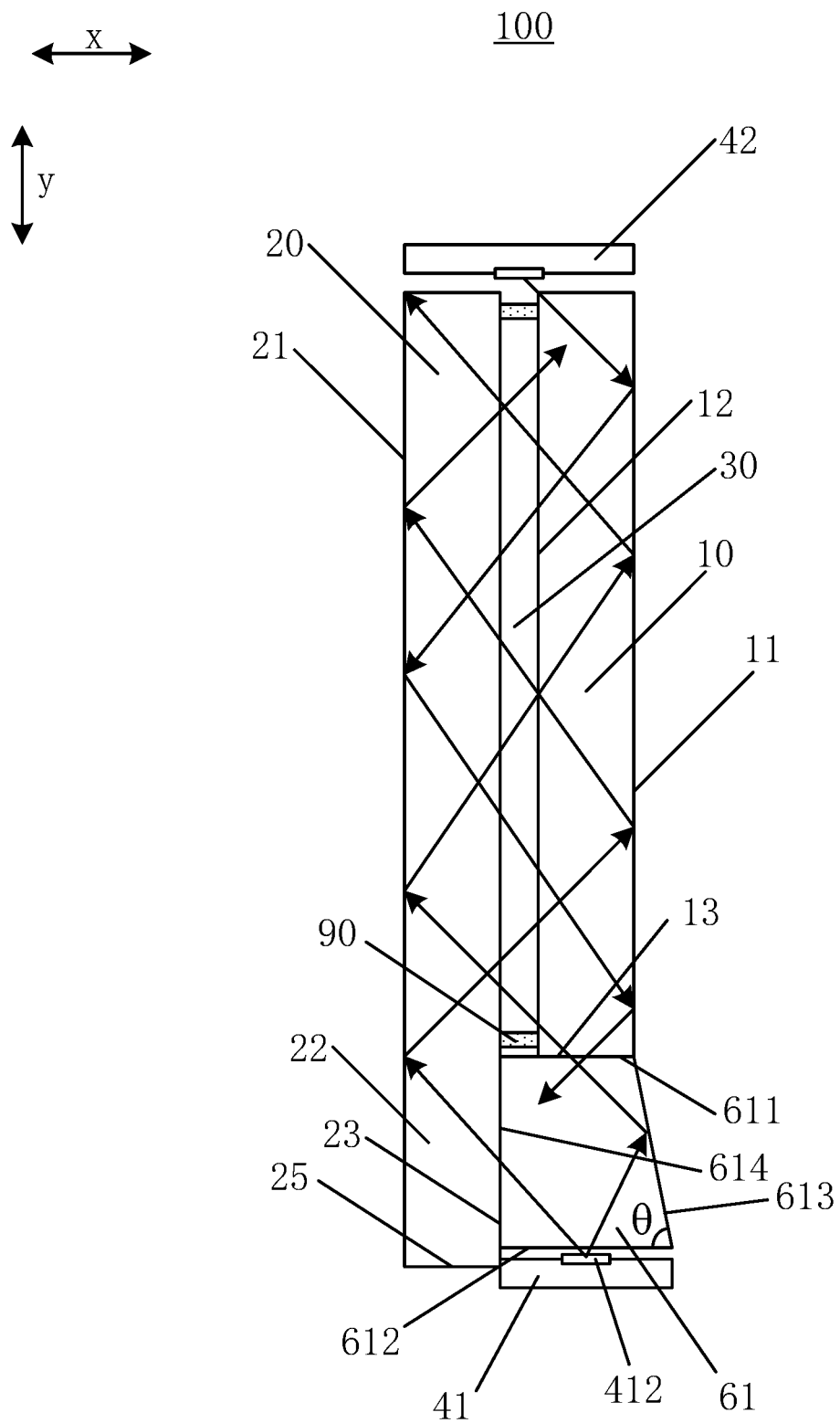
FIG. 10 schematically shows a schematic diagram of a transparent display panel according to other embodiments of the present disclosure.

In some embodiments, a distance between the first light guide bar surface 611 and the second light guide bar surface 612 is less than or equal to a length difference between the second substrate 20 and the first substrate 10 in a direction perpendicular to the first light incident surface 13 (y-direction shown in FIG. 2 and FIG. 3). In other words, the second light guide bar surface 612 may be substantially flush with an edge of the second substrate 20 close to the first light source assembly 41 or may be closer to the first light incident surface 13 than the edge of the second substrate 20 close to the first light source assembly 41. FIG. 10 shows a case that the distance between the first light guide bar surface 611 and the second light guide bar surface 612 is less than the length difference between the second substrate 20 and the first substrate 10 in the direction perpendicular to the first light incident surface 13. In this case, the second light guide bar surface 612 is closer to the first substrate 10 than the edge 25 of the second substrate 20. Accordingly, if the second light guide bar surface 612 is closer to the first light incident surface 13 than the edge 25 of the second substrate 20 close to the first light source assembly 41, the first light source assembly 41 may also be arranged closer to the first light incident surface 13 than the edge 25 of the second substrate 20, which is beneficial to reduce a space occupied by the first light guide bar 61 and the first light source assembly 41. As an example, the length difference between the first substrate 10 and the second substrate 20 may be in a range of 5 mm to 15 mm, such as 10 mm.

In some embodiments, a width of the first light guide bar surface 611 in the direction (the x-direction shown in FIG. 2 and FIG. 3) perpendicular to the first display surface 11 of the first substrate 10 may be less than or equal to a thickness sum of the first substrate 10 and the liquid crystal layer 30 in the direction perpendicular to the first display surface 11 of the first substrate 10, which may prevent the first light guide bar surface 611 from extending beyond the first display surface 11 of the first substrate 10 in the direction (the x-direction shown in FIG. 2 and FIG. 3) perpendicular to the first display surface 11 of the first substrate 10, so as to avoid a light leakage caused by the first light guide bar surface 611 extending beyond the first display surface 11 of the first substrate 10. As an example, an edge of the first light guide bar surface 611 close to the first light guide bar slope surface 613 may be flush with the first display surface 11 of the first substrate 10 (referring to FIG. 2), or the edge of the first light guide bar surface 611 close to the first light guide bar slope surface 613 may be indented toward the liquid crystal layer 30 with respect to the first display surface 11 of the first substrate 10 (referring to FIG. 9), either of which may cause the light exited from the first light guide bar surface 611 of the first light guide bar 61 to almost totally enter the first substrate 10.

In some embodiments, a width of the first light source assembly 41 in the direction (the x-direction as shown in FIG. 2) perpendicular to the first display surface 11 of the first substrate 10 is less than or equal to the width of the second light guide bar surface 612 in the direction perpendicular to the first display surface 11 of the first substrate 10, so that the second light guide bar surface 612 may be arranged to completely cover the first light source assembly 41. In this way, most of the light emitted from the first light source assembly 41 may be received by the second light guide bar surface 612, so as to improve the optical efficiency.

In some embodiments, as shown in FIG. 3, the transparent display panel 100 may further include a fixing frame 70, which includes a positioning surface 71 matched with the first light guide bar slope surface 613 of the first light guide bar 61 and a light source fixing portion 72 for fixing the first light source assembly 41. In the embodiment shown in FIG. 3, the positioning surface 71 is a slope surface with a slope gradient matched with that of the first light guide bar slope surface 613 (for example, the slope gradient of the positioning surface 71 is the same as that of the first light guide bar slope surface 613). With a cooperation of the positioning surface 71 and the first light guide bar slope surface 613, the fixing frame 70 keeps the first light guide bar surface 611 of the first light guide bar 61 in contact with the first light incident surface 13 of the first substrate 10 and keeps the third light guide bar surface 614 of the first light guide bar 61 in contact with the structure (for example, the COG encapsulation 231) on the second light incident surface 23 of the second substrate 20. The light source fixing portion 72 may be provided with a groove for accommodating the first light source assembly 41, which may be used to keep a correct position of the first light source assembly 41 with respect to the first light guide bar 61. The groove is arranged to face the second light guide bar surface 612 of the first light guide bar 61. The fixing frame 70 may hold the first light guide bar 61 together with the first substrate 10 and the second substrate 20 from a side of the second substrate 20 away from the first light guide bar 61 and a side of the first substrate 10 away from the second substrate 20. Such a solution may avoid using an adhesive between the first light guide bar 61 and the first substrate 10 and between the first light guide bar 61 and the second substrate 20, so that a manufacturing process is simplified. Moreover, as no adhesive is required between the third light guide bar surface 614 of the first light guide bar 61 and the second substrate 20 and between the first light guide bar surface 611 and the first substrate 10, the optical coupling efficiency of the light from the first light guide bar 61 to the first substrate 10 and the second substrate 20 may be improved. As an example, a gap may be provided between a surface of the first light source assembly 41 facing the first light guide bar 61 and the second light guide bar surface 612 of the first light guide bar 61, and the gap may be in a range of, for example, 0.5 mm to 2 mm. In some embodiments, the fixing frame 70 may keep a relative positional relationship between the first light guide bar 61 and the first substrate 10 and the second substrate 20 by using the above-mentioned mechanical cooperation. However, the embodiments of the present disclosure are not limited thereto. For example, the positioning surface 71 of the fixing frame 70 may also be bonded to the first light guide bar slope surface 613 of the first light guide bar 61 by an adhesive.

Figure 4:
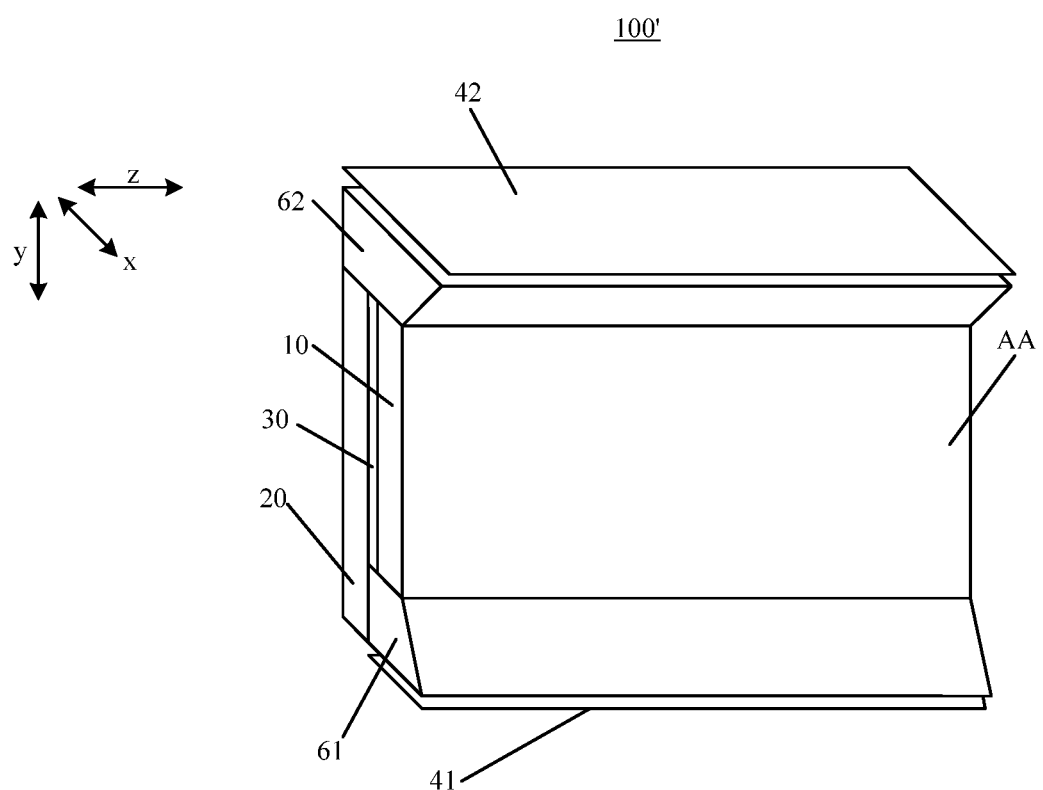
FIG. 4 shows a schematic perspective view of a transparent display panel according to other embodiments of the present disclosure.
Figure 5:
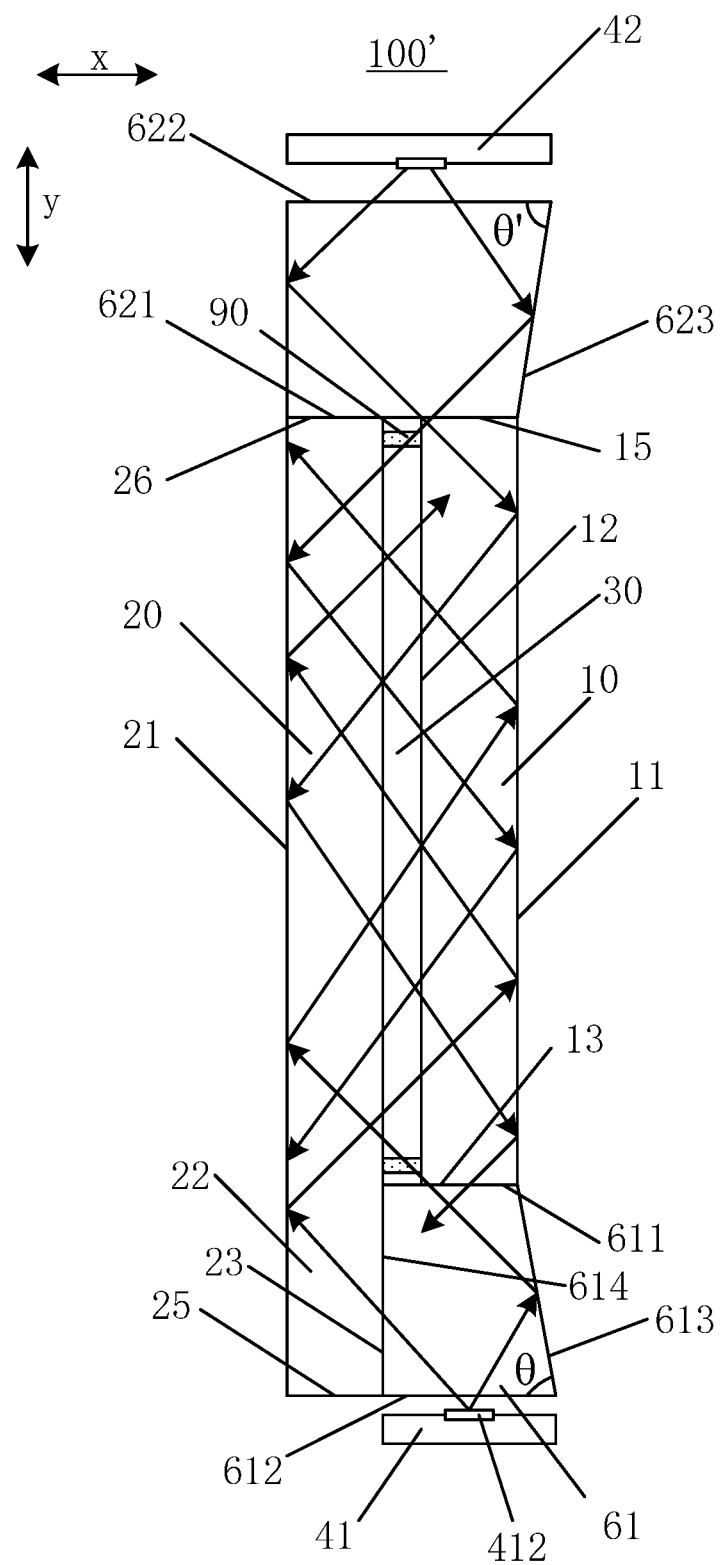
FIG. 5 shows a schematic side view of the transparent display panel shown in FIG. 4.

In the above-mentioned embodiments, a case that the light guide bar (that is, the first light guide bar 61) is provided on only one side of the transparent display panel 100 is illustrated. However, in other embodiments, in addition to the first light guide bar 61, a second light guide bar 62 may be further provided between a second light source assembly 42 on another side of the transparent display panel 100 (located above the first substrate 10 and the second substrate 20 shown in FIG. 4 and FIG. 5) and the first and second substrates 10 and 20. The first substrate 10 may further include a third light incident surface 15 arranged on a side of the first substrate 10 opposite to the side of the first substrate 10 where the first light incident surface 13 is located. The second substrate 20 may further include a fourth light incident surface 26 located on the same side of a transparent display panel 100' as the third light incident surface 15, that is, the side where the second light source assembly 42 of the transparent display panel is located. As an example, the second light guide bar 62 is located on a side of the second light source assembly 42 facing the third light incident surface 15 and the fourth light incident surface 26 and on a side of the third light incident surface 15 and the fourth light incident surface 26 facing the second light source assembly 42. The second light guide bar 62 has a fourth light guide bar surface 621 facing the third light incident surface 15 and the fourth light incident surface 26, a fifth light guide bar surface 622 away from the third light incident surface 15 and the fourth light incident surface 26, and a second light guide bar slope surface 623 located between the fourth light guide bar surface 621 and the fifth light guide bar surface 622. An inner angle formed between the second light guide bar slope surface 623 and the fifth light guide bar surface 622 is less than or equal to 90 degrees.

The above-mentioned solution in which the second light guide bar 62 is provided may be used, for example, in a case that the second light source assembly 42 has a large width (beyond the thickness sum of the first substrate 10, the second substrate 20 and the liquid crystal layer 30) in the direction (for example, the x-direction shown in FIG. 5) perpendicular to the first display surface 11 of the first substrate 10. It may be understood that when the second light source assembly 42 has a large width, more light emitting elements (e.g., LED chips) may be provided on the second light source assembly 42 to achieve a greater light intensity. With the second light guide bar 62, the light emitted by the light emitting elements on a part of the second light source assembly 42 extending beyond the first substrate 10 or the second substrate 20 in the direction perpendicular to the first display surface 11 of the first substrate 10 may also be guided to the first substrate 10 or the second substrate 20, so as to enhance the luminance of the transparent display panel and improve the display effect. The light emitted from the second light source assembly 42 and guided to the first substrate 10 and the second substrate 20 through the second light guide bar 62 may also be reflected back and forth (a total reflection is desired) between the first display surface 11 of the first substrate 10 and the second surface 21 of the second substrate 20 away from the first substrate 10.

In some embodiments, a width of the fourth light guide bar surface 621 in the direction (e.g., the x-direction shown in FIG. 5) perpendicular to the first display surface 11 is less than or equal to the thicknesses sum of the first substrate 10, the second substrate 20 and the liquid crystal layer 30 in the direction (e.g., the x-direction shown in FIG. 5) perpendicular to the first display surface 11, which may facilitate an arrangement of the fourth light guide bar surface 621 not exceeding the first display surface 11 of the first substrate 10 and the second surface 21 of the second substrate 20 away from the first substrate 10 in the direction perpendicular to the first display surface 11. As an example, similarly, the fourth light guide bar surface 621 may also be arranged not to exceed a boundary of the first substrate 10 and a boundary of the second substrate 20 in a length direction of the second light guide bar 62. In this way, the light exited from the second light guide bar 62 may be easily guided to the first substrate 10 and the second substrate 20 as much as possible, so as to improve the optical efficiency.

In some embodiments, the fourth light guide bar surface 621 may be in contact with the third light incident surface 15 and the fourth light incident surface 26, which is beneficial to maintain a stable relative relationship between the fourth light guide bar surface 621 and the third and fourth light incident surfaces 15 and 26 and improve the optical coupling efficiency of the light from the second light guide bar 62 into the first substrate 10 and the second substrate 20. However, the embodiments of the present disclosure are not limited thereto. For example, the fourth light guide bar surface 621 may also be bonded to the third light incident surface 15 and the fourth light incident surface 26 by an at least partially transparent adhesive layer.

In some embodiments, the width of the second light source assembly 42 in the direction (the x-direction shown in FIG. 4 and FIG. 5) perpendicular to the first display surface 11 is greater than the thickness sum of the first substrate 10, the second substrate 20 and the liquid crystal layer 30 in the direction perpendicular to the first display surface 11, which means that the second light source assembly 42 with a larger size can be used in a case that the second light guide bar 62 is used. Moreover, the width of the second light source assembly 42 in the direction perpendicular to the first display surface 11 may also be less than or equal to that of the fifth light guide bar surface 622 in the direction perpendicular to the first display surface 11, so that a surface of the second light source assembly 42 facing the second light guide bar 62 may be completely covered by the fifth light guide bar surface 622, and an energy of the light emitted by the second light source assembly 42 may be utilized more effectively.

In some embodiments, a gap in a range of 0.5 mm to 2 mm may be provided between the first light source assembly 41 and the second light guide bar surface 612 of the first light guide bar 61. In some embodiments, a gap in a range of 0.5 mm to 2 mm may be provided between the second light source assembly 42 and the fifth light guide bar surface 622 of the second light guide bar 62. This may prevent the first light guide bar 61 from pressing the first light source assembly 41 and prevent the second light guide bar 62 from pressing the second light source assembly 42.

In some embodiments, the first light guide bar 61, the second light guide bar 62, the first substrate 10 and the second substrate 20 have the same refractive index and are made of, for example, a light transmitting material such as glass or resin, which is beneficial to avoid an undesired refraction of light when the light enters the first substrate 10 or the second substrate 20 from the first light guide bar 61 or the second light guide bar 62. However, the embodiments of the present disclosure are not limited thereto. Any two of the first light guide bar 61, the second light guide bar 62, the first substrate 10 and the second substrate 20 may have different refractive indices.

Figure 8:
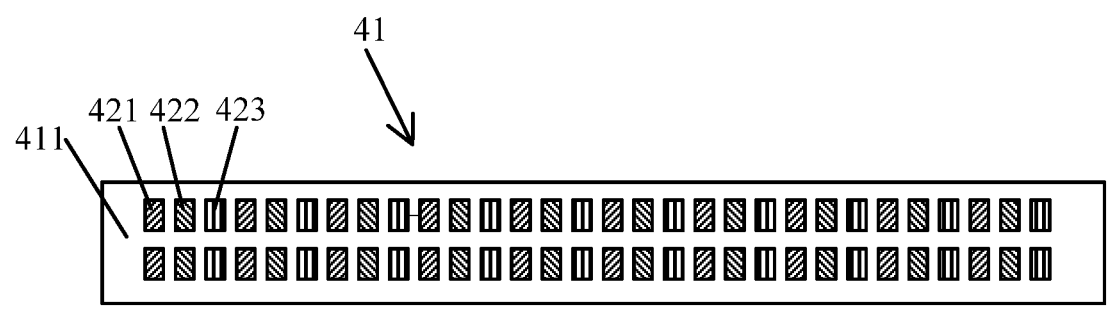
FIG. 8 schematically shows a plan view of a light source assembly in a transparent display panel according to the embodiments of the present disclosure.

An exemplary structure of the first light source assembly 41 is shown in FIG. 8. The first light source assembly 41 may include a carrier board 411 and a plurality of light emitting elements 412 arranged on the carrier board 411. The light emitting elements 412 may be arranged on a side of the carrier board 411 facing the first substrate 10 so as to face the second light guide bar surface 612 of the first light guide bar 61. The plurality of light emitting elements 412 may be arranged on the carrier board 411 in an array. As an example, an orthographic projection of the first light guide bar 61 on the first light source assembly 41 may cover the plurality of light emitting elements 412, so that the light emitted by these light emitting elements 412 may be better received by the first light guide bar 61, thereby improving the optical coupling efficiency. In some embodiments, the plurality of light emitting elements may include a plurality of light emitting diode chips. As an example, the plurality of light emitting diode chips may have the same color or multiple colors. For example, the first light source assembly 41 may include a plurality of groups of light emitting elements, and each group of light emitting elements may include a red light emitting diode chip 421, a green light emitting diode chip 422 and a blue light emitting diode chip 423. The plurality of groups of light emitting elements may respectively correspond to pixel units 50 on the display panel, which may be used to achieve a color display. A structure of the second light source assembly 42 may be similar to that of the first light source assembly 41, only with a difference in dimension. Therefore, a specific structural example of the second light source assembly 42 will not be described in details here.

Figure 6:
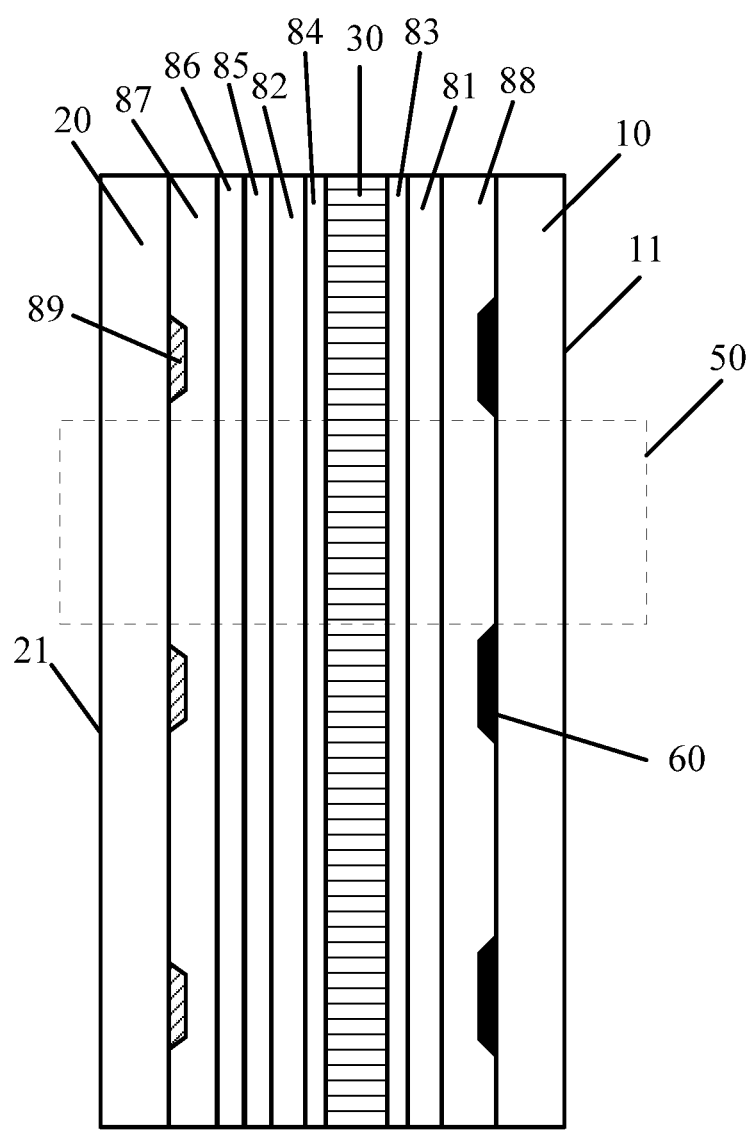
FIG. 6 schematically shows a film layer structure diagram of a transparent display panel according to some embodiments of the present disclosure.

As shown in FIG. 6, the transparent display panel 100 may further include a first electrode layer 81 and a second electrode layer 82. The first electrode layer 81 is located between the liquid crystal layer 30 and the first substrate 10 in the direction perpendicular to the first display surface 11. The second electrode layer 82 may be located between the liquid crystal layer 30 and the second substrate 20 in the direction perpendicular to the first display surface 11. As described above, the liquid crystal layer 30 may have a light transmission state and at least one light scattering state. The first electrode layer 81 and the second electrode layer 82 may be used to control the liquid crystal layer 30 to switch between the light transmission state and the at least one light scattering state. A plurality of pixel units 50 may be arranged on the transparent display panel 100, and the first electrode layer 81 and the second electrode layer 82 may perform a voltage control on respective parts of the liquid crystal layer 30 corresponding to the pixel units 50, so as to achieve a transparent image display. As an example, the transparent display panel 100 may further include a first alignment layer 83 and a second alignment layer 84. The first alignment layer 83 is located on a side of the liquid crystal layer 30 facing the first electrode layer 81, and the second alignment layer 84 is located on a side of the liquid crystal layer 30 facing the second electrode layer 82. In some embodiments, the first electrode layer 81 and the second electrode layer 82 may be transparent electrode layers. Some transparent film layer structures may be further provided on the first substrate 10 and the second substrate 20. For example, as shown in FIG. 6, a first insulating layer (e.g., a planarization layer) 85, a second insulating layer (e.g., an etch stop layer) 86, a third insulating layer (e.g., a gate insulating layer) 87 and other film layers may be sequentially provided on the side of the second substrate 20 facing the liquid crystal layer 30, and a fourth insulating layer (e.g., a protective layer) 88 may be further provided on the side of the first substrate 10 facing the liquid crystal layer 30. A light is allowed to pass through these film layers, so that the light entering the first substrate 10 and the second substrate 20 may easily pass through these transparent film layers when being reflected back and forth between the first display surface 11 of the first substrate 10 and the second surface 21 of the second substrate 20. An exemplary pixel unit 50 is shown in FIG. 6, and adjacent pixel units 50 may be separated by a black matrix 60. The black matrix 60 may be used for some opaque structures (e.g., a metal wire 89, etc.) on the second substrate 20 to increase the contrast ratio of the display image. However, it should be noted that the black matrix 60 is not an essential structure in the embodiments according to the present disclosure.

Similar to the first light guide bar 61, in some embodiments, an inner angle θ' formed between the second light guide bar slope surface 623 and the fifth light guide bar surface 622 of the second light guide bar 62 may be greater than 70 degrees, for example, greater than 84.5 degrees. An analysis of the inner angle θ' formed between the second light guide bar slope surface 623 and the fifth light guide bar surface 622 of the second light guide bar 62 may refer to the above description of the inner angle θ formed between the first light guide bar slope surface 613 and the second light guide bar surface 612 of the first light guide bar 61.

Figure 12:
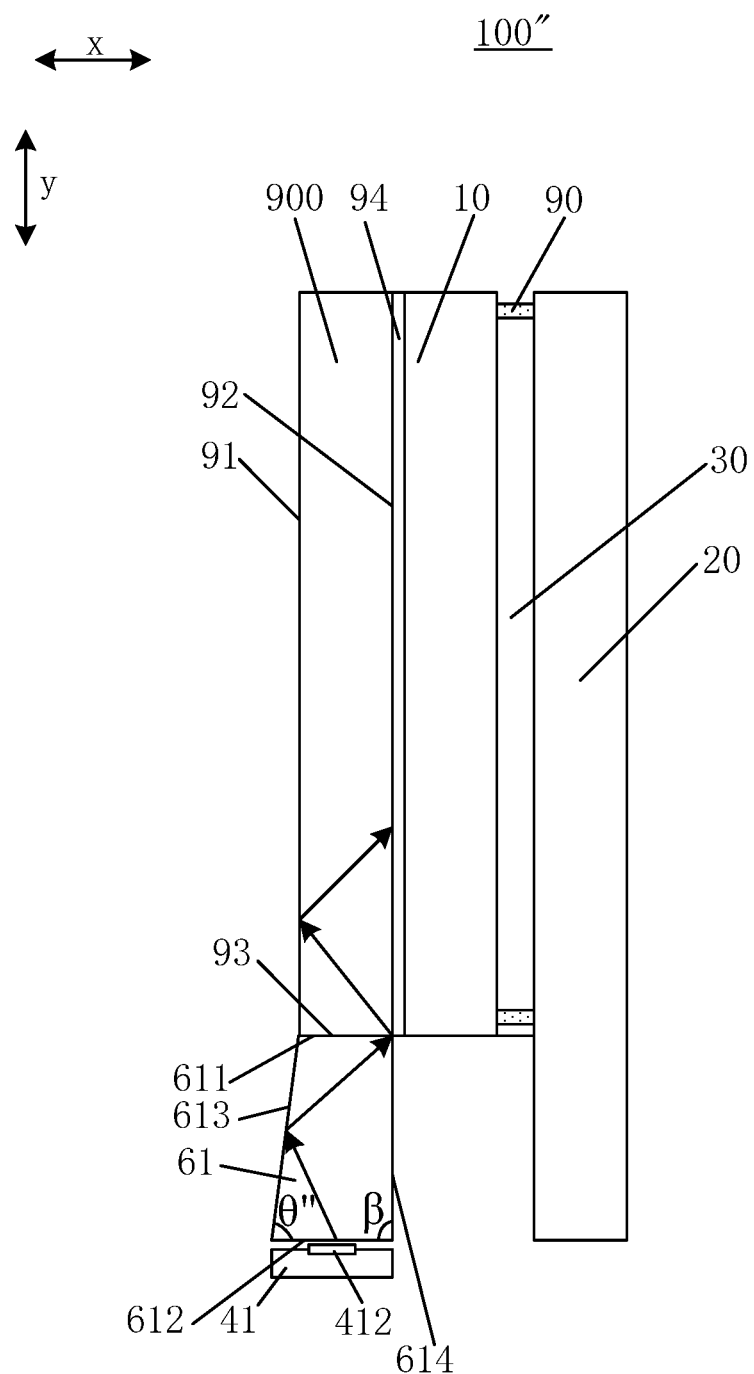
FIG. 12 schematically shows a schematic diagram of a transparent display panel according to other embodiments of the present disclosure.

FIG. 12 shows a transparent display panel 100" according to the embodiments of the present disclosure. The transparent display panel 100" also includes a first substrate 10, a second substrate 20, and a liquid crystal layer 30 located between the first substrate 10 and the second substrate 20. Different from the embodiments described above, the transparent display panel 100" further includes a light guide plate 900 located on a side of the first substrate 10 away from the liquid crystal layer 30. The light guide plate 900 may be used to improve a homogeneity of light intensity. Specifically, the light input from the light guide plate 900 may have better homogeneity through a reflection in the light guide plate 900. Considering a design requirement of the light guide plate 900 and a weight and thickness of the entire panel, the light guide plate 900 generally has a small thickness, for example, less than 1 mm, such as about 0.5 mm. The width of the light source assembly (e.g., the first light source assembly 41) may exceed the thickness of the light guide plate 900 and may be, for example, equal to or greater than 1 mm. Moreover, in order to increase the luminance of the light source, the number of the light emitting elements (e.g., light emitting diode chips) needs to be increased, so that the light source assembly may be wider. Therefore, in order to achieve the light coupling between the light source assembly and the light guide plate and improve a light extraction efficiency, the structure of the first light guide bar 61 described above may be used as a coupling component between the light source assembly and the light guide plate 900. The light guide plate 900 described above includes, but is not limited to, a conventional light guide plate, a front type light guide plate, and other light guide structures that may achieve light transmission and light extraction.

In some embodiments, the light guide plate 900 has a first light guide plate surface 91 away from the liquid crystal layer 30, a second light guide plate surface 92 facing the liquid crystal layer 30, and a fifth light incident surface 93 located between the first light guide plate surface 91 and the second light guide plate surface 92. As shown in FIG. 12, the first light source assembly 41 may be located on a side, where the fifth light incident surface 93 is located, of the light guide plate 900. A first light guide bar 61 is provided in the transparent display panel 100", and the first light guide bar 61 is located between the first light source assembly 41 and the fifth light incident surface 93. The first light guide bar 61 has a first light guide bar surface 611 facing the fifth light incident surface 93, a second light guide bar surface 612 away from the fifth light incident surface 93, and a first light guide bar slope surface 613 located between the first light guide bar surface 611 and the second light guide bar surface 612. Similar to the above-mentioned embodiments, an inner angle θ" formed between the first light guide bar slope surface 613 and the second light guide bar surface 612 is less than or equal to 90 degrees, and it is desired that the inner angle is greater than 70 degrees, for example, greater than 84.5 degrees.

By means of the first light guide bar 61, the light emitted by the first light source assembly 41 with a large size may be efficiently coupled into the light guide plate 900, which allows an arrangement of more light emitting elements on the first light source assembly 41. In this way, a magnitude and a homogeneity of the luminance of the display panel may be improved.

In some embodiments, the transparent display panel 100" may further include a refractive index matching layer 94 arranged on a surface of the light guide plate 900 facing the liquid crystal layer 30. For example, when the light guide plate 900 is located on the side of the first substrate 10 away from the liquid crystal layer 30, the refractive index matching layer 94 is located between the light guide plate 900 and the first substrate 10; and when the light guide plate 900 is located on a side of the second substrate 20 away from the liquid crystal layer 30, the refractive index matching layer 94 is located between the light guide plate 900 and the second substrate 20. A refractive index of the refractive index matching layer 94 is less than that of the light guide plate 900, that of the first substrate 10 and that of the second substrate 20. This may ensure that a total reflection condition may be satisfied at an interface between the light guide plate 900 and the refractive index matching layer 94 for a light travelling from the light guide plate 900 toward the refractive index matching layer 94, and similarly, the total reflection condition may be satisfied at an interface between the first substrate 10 and the refractive index matching layer 94 or an interface between the second substrate 20 and the refractive index matching layer 94 for a light travelling from the first substrate 10 or the second substrate 20 toward the refractive index matching layer 94. As an example, the first substrate 10, the second substrate 20 and the light guide plate 900 may be made of the same material (e.g., glass, etc.).

Similar to the embodiments described above, the second substrate 20 may have an edge extension portion 22 located on the same side of the transparent display panel as the first light source assembly 41, and the orthographic projection of the first substrate 10 on the surface of the second substrate 20 facing the first substrate 10 does not overlap the edge extension portion 22.

Figure 14:
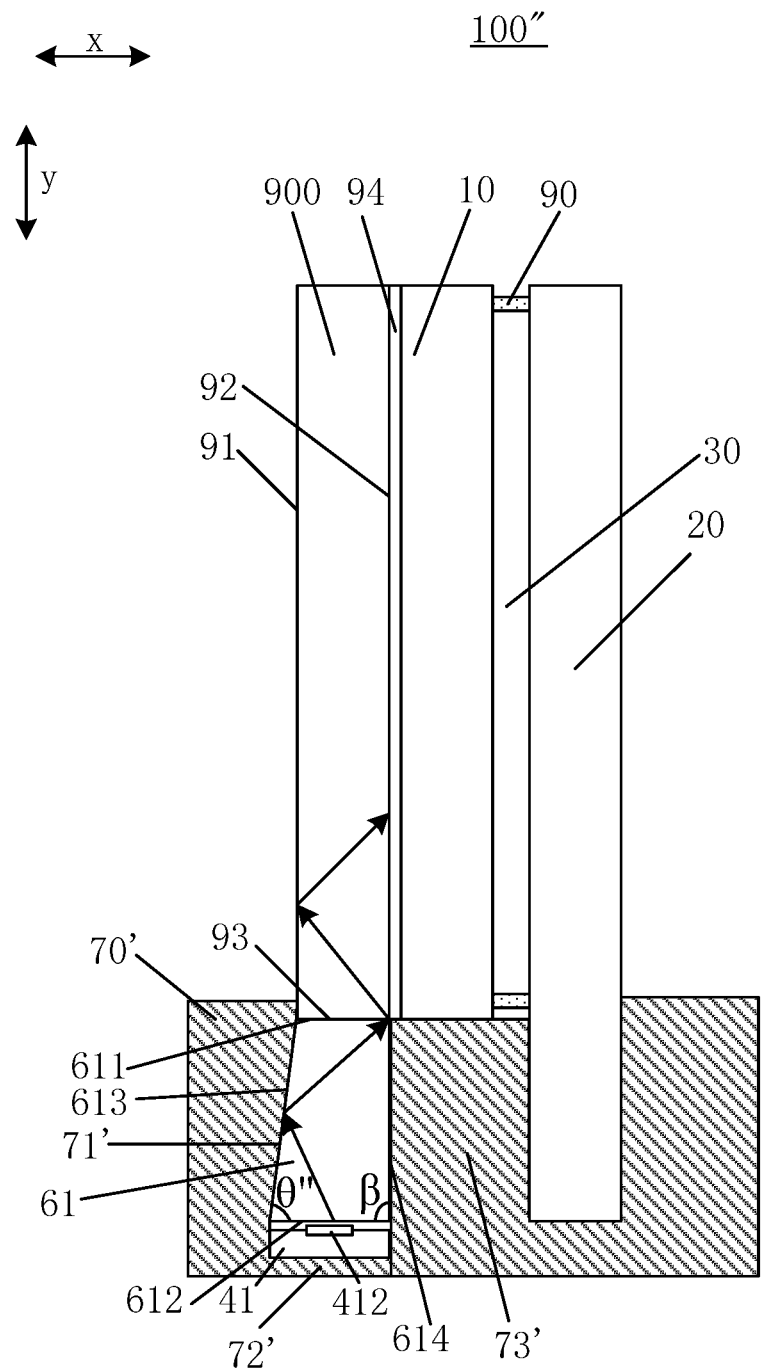
FIG. 14 schematically shows a schematic diagram of a transparent display panel according to other embodiments of the present disclosure.

In some embodiments, as shown in FIG. 14, the transparent display panel 100" may further include a fixing frame 70' for fixing the first light guide bar 61. The fixing frame 70' includes a positioning surface 71' matched with the first light guide bar slope surface 613 of the first light guide bar 61. The positioning surface 71' and the first light guide bar slope surface 613 are inclined surfaces having a same inclination angle. With the cooperation of the positioning surface 71' and the first light guide bar slope surface 613, the fixing frame 70' may keep the first light guide bar surface 611 of the first light guide bar 61 in contact with the fifth light incident surface 93 of the light guide plate 900. In the example shown in FIG. 14, as an obvious gap exists between the first light guide bar 61 and the edge extension portion 22 of the second substrate 20, the fixing frame 70' may further include an extension 73' extending between the first light guide bar 61 and the edge extension portion 22 of the second substrate 20, so as to improve a stability of the first light guide bar 61. The fixing frame 70' may further include a light source fixing portion 72' for fixing the first light source assembly 41. The light source fixing portion 72' may be provided with a groove for accommodating the first light source assembly 41, which may be used to keep the correct position of the first light source assembly 41 with respect to the first light guide bar 61. The groove is arranged to face the second light guide bar surface 612 of the first light guide bar 61. The fixing frame 70' may hold the first light guide bar 61 together with the light guide plate 900, the first substrate 10 and the second substrate 20 from the side of the second substrate 20 away from the first light guide bar 61 and the side of the light guide plate 900 away from the second substrate 20. Such solution may avoid using an adhesive between the first light guide bar 61 and the first substrate 10 and between the first light guide bar 61 and the second substrate 20, so that a manufacturing process is simplified. In the example shown in FIG. 14, the fixing frame 70' is assembled by two parts, including a first part on the left side of the third light guide bar surface 614 and a second part on the right side of the third light guide bar surface 614, which may facilitate an installation of the fixing frame 70'. However, the embodiments of the present disclosure are not limited thereto. For example, the fixing frame 70' may be an integral structure.

Figure 16:
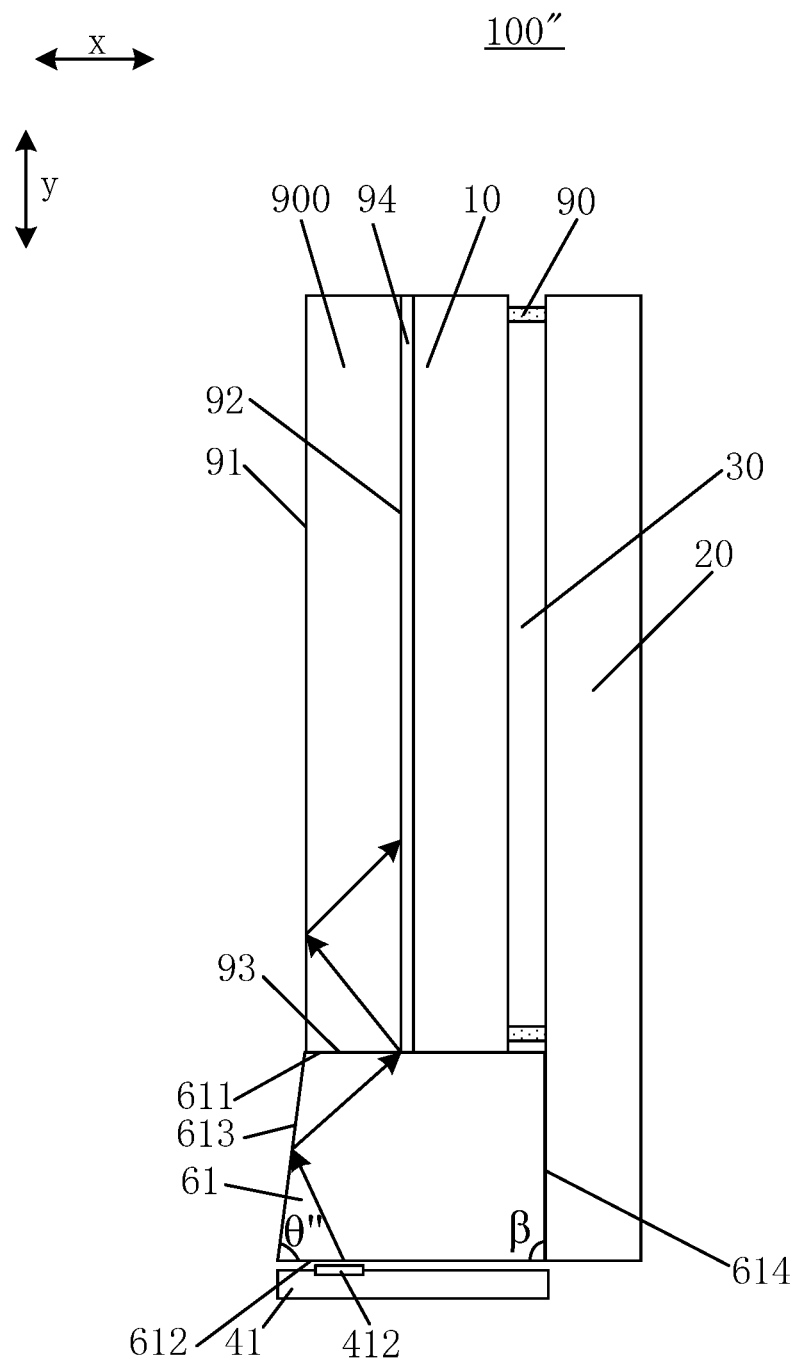
FIG. 16 schematically shows a schematic diagram of a transparent display panel according to other embodiments of the present disclosure.

In some embodiments, as shown in FIG. 12, the light guide plate 900 is located on the side of the first substrate 10 away from the liquid crystal layer 30, and a width of the first light guide bar surface 611 in a direction perpendicular to the first light guide plate surface 91 is equal to or greater than the thickness of the light guide plate 900. For example, the width of the first light guide bar surface 611 in the direction perpendicular to the first light guide plate surface 91 is equal to a thickness sum of the light guide plate 900, the refractive index matching layer 94, the first substrate 10 and the liquid crystal layer 30 (as shown in FIG. 16). When the width of the first light guide bar surface 611 in the direction perpendicular to the first light guide plate surface 91 is equal to or greater than the thickness of the light guide plate 900, a part of the light exited from the first light guide bar surface 611 may enter the light guide plate 900 and then may be reflected back and forth between the first light guide plate surface 91 and the second light guide plate surface 92 of the light guide plate 900, while the other part of the light exited from the first light guide bar surface 611 may enter the first substrate 10 and then may be reflected back and forth between the first substrate 10 and the second substrate 20. Both parts of the light may be used to achieve the image display of the panel.

Figure 13:
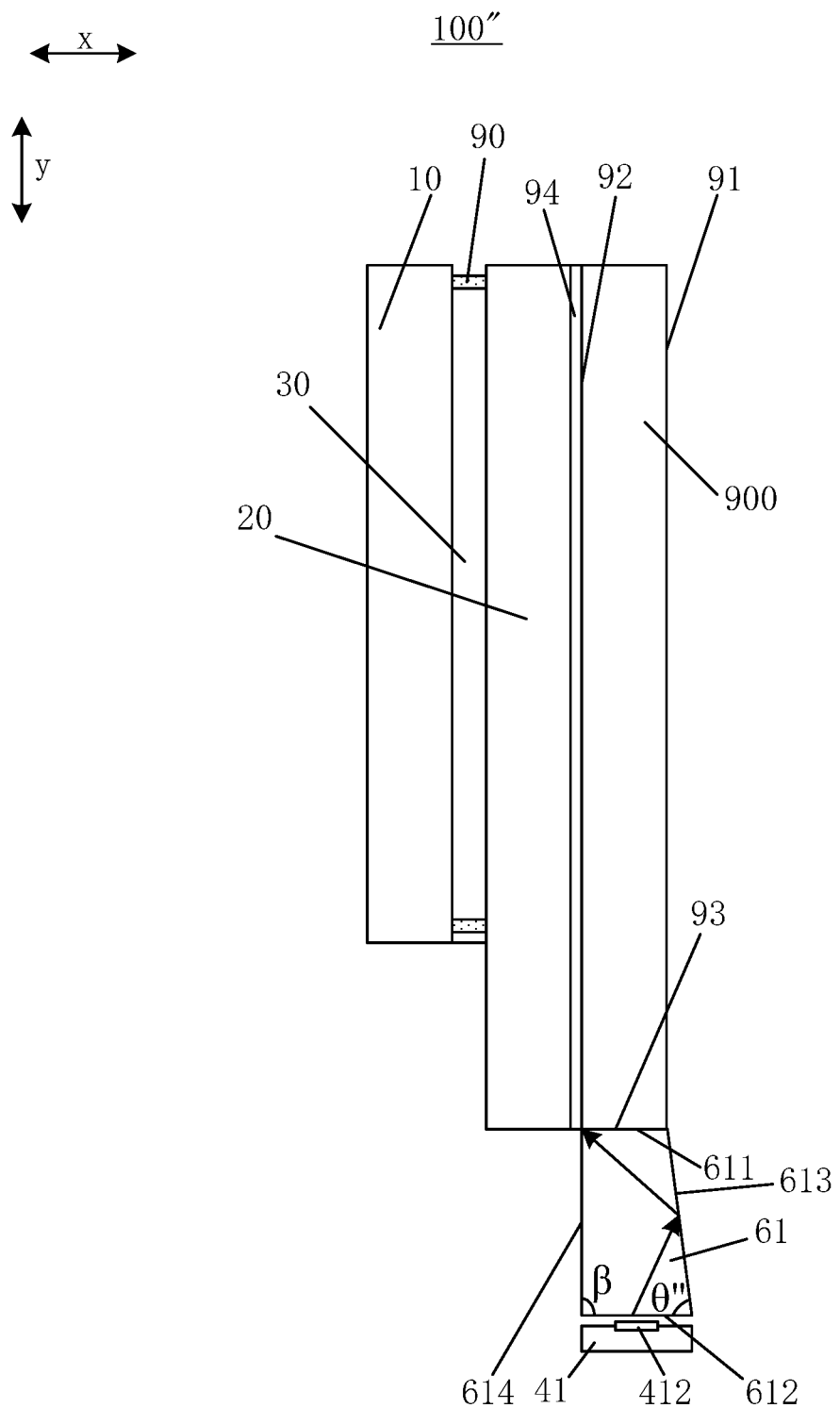
FIG. 13 schematically shows a schematic diagram of a transparent display panel according to other embodiments of the present disclosure.
Figure 17:
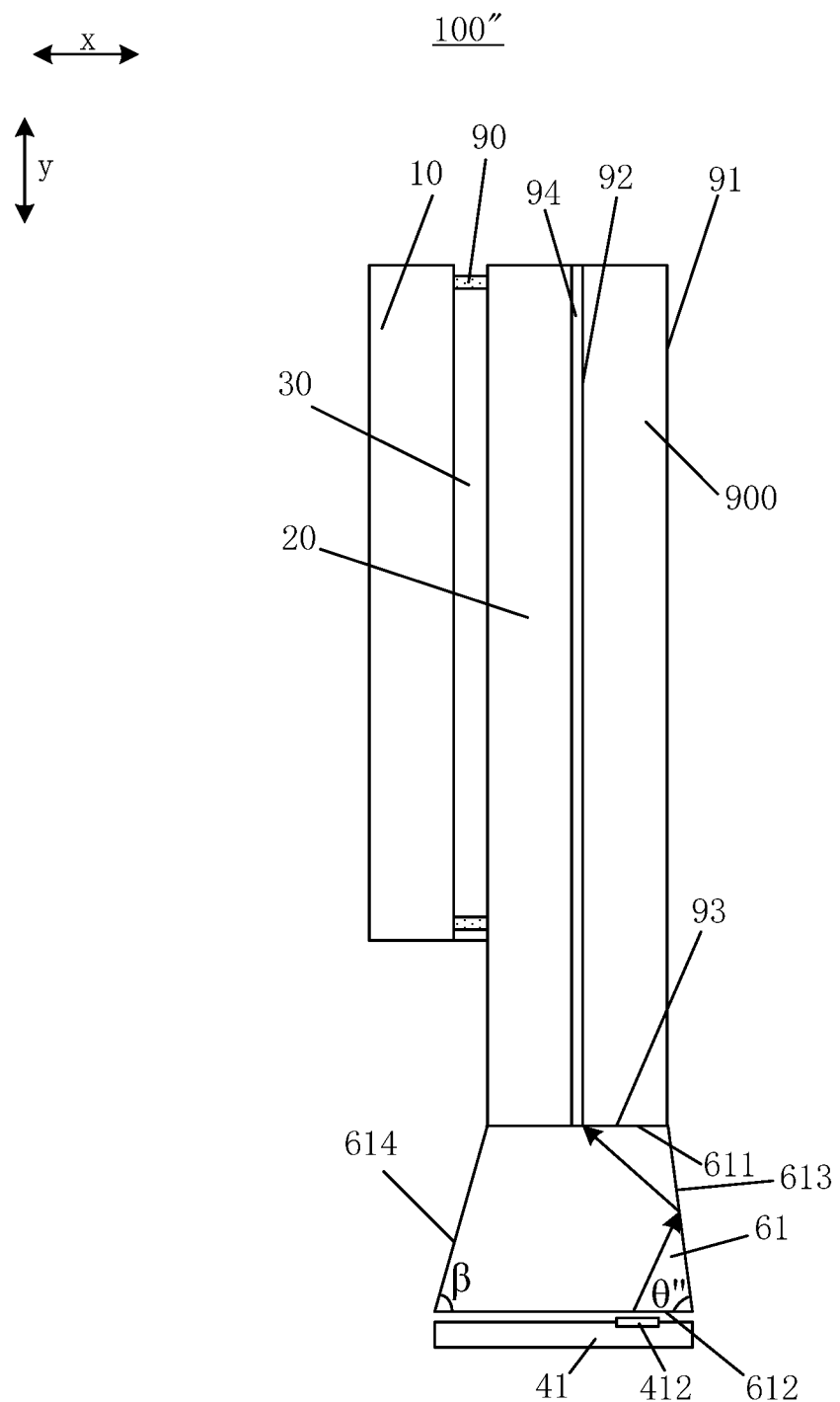
FIG. 17 schematically shows a schematic diagram of a transparent display panel according to other embodiments of the present disclosure.

In another embodiment, as shown in FIG. 13, the light guide plate 900 is located on the side of the second substrate 20 away from the liquid crystal layer 30, and the width of the first light guide bar surface 611 in the direction perpendicular to the first light guide plate surface 91 is equal to or greater than the thickness of the light guide plate 900. For example, the width of the first light guide bar surface 611 in the direction perpendicular to the first light guide plate surface 91 is equal to a thickness sum of the light guide plate 900, the refractive index matching layer 94 and the second substrate 20 (as shown in FIG. 17). When the width of the first light guide bar surface 611 in the direction perpendicular to the first light guide plate surface 91 is equal to or greater than the thickness of the light guide plate 900, a part of the light exited from the first light guide bar surface 611 may enter the light guide plate 900 and then may be reflected back and forth between the first light guide plate surface 91 and the second light guide plate surface 92 of the light guide plate 900, while the other part of the light exited from the first light guide bar surface 611 may enter the second substrate 20 and then may be reflected back and forth between the first substrate 10 and the second substrate 20. Both parts of the light may be used to achieve the image display of the panel.

The greater the width of the first light guide bar surface 611, the larger a coupling area between the first light guide bar 61 and the light guide plate 900 (or a combination of the light guide plate 900 and the first substrate 10, or a combination of the light guide plate 900 and the second substrate 20).

In some embodiments, an area of the second light guide bar surface 612 is greater than that of the first light guide bar surface 611.

Figure 15:
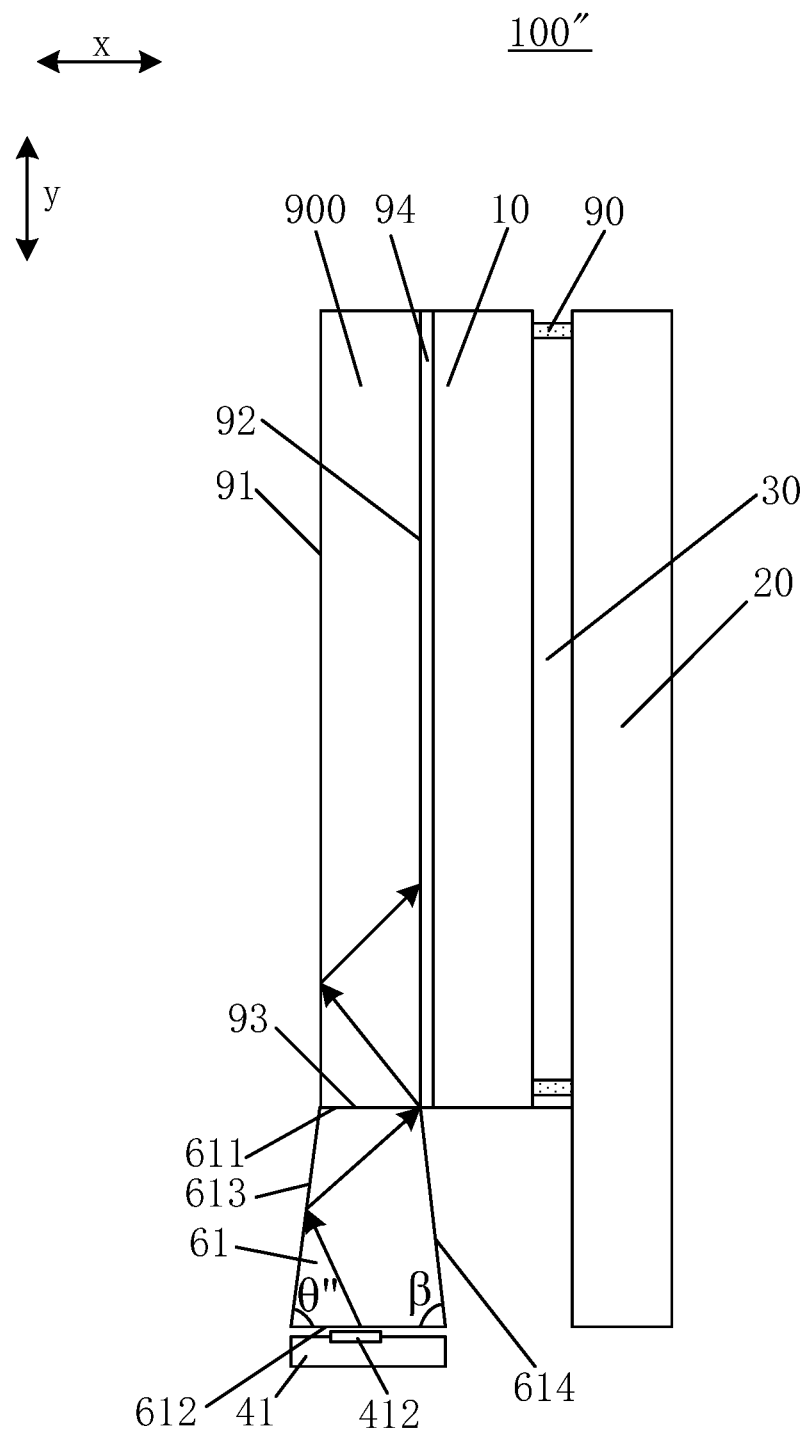
FIG. 15 schematically shows a schematic diagram of a transparent display panel according to other embodiments of the present disclosure.

In some embodiments, the first light guide bar 61 may further include a third light guide bar surface 614 on a side opposite to a side where the first light guide bar slope surface 613 is located, and an inner angle β formed between the third light guide bar surface 614 and the second light guide bar surface 612 is less than or equal to 90 degrees. In the embodiments shown in FIG. 12 to FIG. 14, the inner angle β formed between the third light guide bar surface 614 and the second light guide bar surface 612 is equal to 90 degrees, while in the example shown in FIG. 15, the inner angle β formed between the third light guide bar surface 614 and the second light guide bar surface 612 is less than 90 degrees. The inner angle β may also be set to be greater than 70 degrees, for example, greater than 84.5 degrees. A value and an optimization of the inner angle β are similar to those of the above-mentioned inner angle θ", and reference may be made to the above analysis, which will not be repeated here.

In some embodiments of the present disclosure, the first light guide plate surface 91 or the second light guide plate surface 92 of the light guide plate 900 may be further provided with some scattering point structures (for example, having a shape of a prism or a semicircle), which may guide the light reflected back and forth in the light guide plate 900 into the first substrate 10 or the second substrate 20.

Although the embodiments shown in FIG. 12 to FIG. 15 only illustrate examples in which one light guide bar is provided, it should be understood that when light source assemblies are provided on opposite sides of the light guide plate 900, such light guide bar may be provided between each light source assembly and the light guide plate 900.

The first light source assembly 41 in the embodiments shown in FIG. 12 to FIG. 17 may have substantially the same or similar structure as the first light source assembly 41 in the foregoing embodiments, which will not be described in details here.

The embodiments of the present disclosure further provide an electronic device, including the transparent display panel 100, 100', 100" described in any of the foregoing embodiments. The electronic device may be any device with a transparent display function, such as a billboard, a window, a digital photo frame, and the like.

Although the present disclosure has been described with reference to the drawings, the embodiments disclosed in the drawings are intended to exemplify the embodiments of the present disclosure, and should not be understood as a limitation of the present disclosure. Size ratios in the drawings are only schematic and should not be construed as limiting the present disclosure.

The embodiments described above merely illustrate the principle and structure of the present disclosure, but are not used to limit the present disclosure. Those skilled in the art should understand that any changes and improvements made to the present disclosure without departing from the general idea of the present disclosure fall within the scope of the present disclosure. The protection scope of the present disclosure shall be determined by the scope defined by the claims of the present disclosure.

What is claimed is:

1. A transparent display panel, comprising:
a first substrate, a second substrate, and a liquid crystal layer located between the first substrate and the second substrate, wherein the first substrate has a first display surface away from the second substrate, a first surface facing the second substrate, and a first light incident surface located between the first display surface and the first surface, the second substrate has an edge extension portion located on a same side of the transparent display panel as the first light incident surface of the first substrate, and an orthographic projection of the first substrate on a surface, facing the first substrate, of the second substrate does not overlap the edge extension portion,
wherein the transparent display panel further comprises:
a first light source assembly located on a first side, where the first light incident surface is located, of the first substrate;
a second light source assembly located on a second side opposite to the first side of the first substrate where the first light source assembly is located; and
a first light guide bar located between the first light source assembly and the first light incident surface, wherein the first light guide bar has a first light guide bar surface facing the first light incident surface, a second light guide bar surface away from the first light incident surface, and a first light guide bar slope surface located between the first light guide bar surface and the second light guide bar surface, and an inner angle formed between the first light guide bar slope surface and the second light guide bar surface is less than or equal to 90 degrees,
wherein a distance between the first light guide bar surface and the second light guide bar surface is equal to a length difference between the second substrate and the first substrate in a direction perpendicular to the first light incident surface.

2. The transparent display panel of claim 1, further comprising a fixing frame configured to fix the first light guide bar to the first substrate and the second substrate, wherein the fixing frame comprises a positioning surface matched with the first light guide bar slope surface of the first light guide bar, and the positioning surface and the first light guide bar slope surface are inclined surfaces having a same inclination angle.

3. The transparent display panel of claim 2, wherein the fixing frame further comprises a light source fixing portion configured to fix the first light source assembly, the light source fixing portion is provided with a groove configured to accommodate the first light source assembly, and the groove is arranged to face the second light guide bar surface of the first light guide bar.

4. The transparent display panel of claim 1, wherein an area of the second light guide bar surface is greater than an area of the first light guide bar surface.

5. The transparent display panel of claim 1, wherein the first light guide bar has a third light guide bar surface facing the second substrate, and the second substrate has a second light incident surface facing the third light guide bar surface for receiving a light exited from the third light guide bar surface.

6. The transparent display panel of claim 5, wherein:
the first light guide bar surface is in contact with the first light incident surface of the first substrate,
a chip-on-glass encapsulation and a chip-on-film encapsulation are provided on the second light incident surface, and
the third light guide bar surface is in contact with the chip-on-glass encapsulation on the second light incident surface of the second substrate.

7. The transparent display panel of claim 6, further comprising a sealant located between the first substrate and the second substrate and on a periphery of the liquid crystal layer for sealing the liquid crystal layer, wherein a gap is provided between the first light guide bar surface and the sealant.

8. The transparent display panel of claim 6, wherein a width of the first light guide bar surface in a direction perpendicular to the first display surface of the first substrate is less than or equal to a thickness sum of the first substrate and the liquid crystal layer in the direction perpendicular to the first display surface of the first substrate.

9. The transparent display panel of claim 5, wherein the first light source assembly is arranged to face the second light guide bar surface of the first light guide bar, and a width of the first light source assembly in a direction perpendicular to the first display surface of the first substrate is less than or equal to that of the second light guide bar surface in the direction perpendicular to the first display surface of the first substrate.

10. The transparent display panel of claim 1, wherein the inner angle formed between the first light guide bar slope surface and the second light guide bar surface is greater than 84.5 degrees.

11. The transparent display panel of claim 1, wherein the first substrate further comprises a third light incident surface arranged on the second side of the first substrate opposite to the first side of the first substrate where the first light incident surface is located, and the second substrate further comprises a fourth light incident surface located on a same side of the transparent display panel as the third light incident surface; and the second light source assembly is arranged on the same side of the transparent display panel as the third light incident surface and the fourth light incident surface; and
wherein the transparent display panel further comprises:
a second light guide bar located on a side of the second light source assembly facing the third light incident surface and the fourth light incident surface and on a side of the third light incident surface and the fourth light incident surface facing the second light source assembly, wherein the second light guide bar has a fourth light guide bar surface facing the third light incident surface and the fourth light incident surface, a fifth light guide bar surface away from the third light incident surface and the fourth light incident surface, and a second light guide bar slope surface located between the fourth light guide bar surface and the fifth light guide bar surface, and an inner angle formed between the second light guide bar slope surface and the fifth light guide bar surface is less than or equal to 90 degrees.

12. The transparent display panel of claim 11, wherein:
a width of the fourth light guide bar surface in a direction perpendicular to the first display surface is less than or equal to a thickness sum of the first substrate, the second substrate and the liquid crystal layer in the direction perpendicular to the first display surface; and/or
the fourth light guide bar surface is in contact with the third light incident surface and the fourth light incident surface.

13. The transparent display panel of claim 11, wherein:
a width of the second light source assembly in a direction perpendicular to the first display surface is greater than a thickness sum of the first substrate, the second substrate and the liquid crystal layer in the direction perpendicular to the first display surface and less than or equal to a width of the fifth light guide bar surface in the direction perpendicular to the first display surface; and/or
at least one of the first light source assembly or the second light source assembly comprises:
a carrier board; and
a plurality of light emitting diode chips, comprising light emitting diode chips having a plurality of colors arranged on a side of the carrier board facing the first substrate.

14. The transparent display panel of claim 11, wherein:
the first light guide bar, the second light guide bar, the first substrate, and the second substrate have a same refractive index and/or
the inner angle formed between the second light guide bar slope surface and the fifth light guide bar surface is greater than 84.5 degrees.

15. The transparent display panel of claim 11, wherein a gap with a size in a range of 0.5 mm to 2 mm is provided between the first light source assembly and the second light guide bar surface of the first light guide bar, and a gap with a size in a range of 0.5 mm to 2 mm is provided between the second light source assembly and the fifth light guide bar surface of the second light guide bar.

16. The transparent display panel of claim 1, further comprising:
a first electrode layer located between the liquid crystal layer and the first substrate in a direction perpendicular to the first display surface;
a second electrode layer located between the liquid crystal layer and the second substrate in the direction perpendicular to the first display surface;
a first alignment layer located on a side of the liquid crystal layer facing the first electrode layer; and
a second alignment layer located on a side of the liquid crystal layer facing the second electrode layer,
wherein the first electrode layer and the second electrode layer are configured to control the liquid crystal layer to switch between a light transmission state and at least one light scattering state.

17. An electronic device comprising the transparent display panel of claim 1.

18. A transparent display panel, comprising:
a first substrate and a second substrate;
a liquid crystal layer located between the first substrate and the second substrate;
a light guide plate located on a side of the first substrate or the second substrate away from the liquid crystal layer, wherein the light guide plate has a first light guide plate surface away from the liquid crystal layer, a second light guide plate surface facing the liquid crystal layer, and a fifth light incident surface located between the first light guide plate surface and the second light guide plate surface;
a first light source assembly located on a side, where the fifth light incident surface is located, of the light guide plate; and
a first light guide bar located between the first light source assembly and the fifth light incident surface, wherein the first light guide bar has a first light guide bar surface facing the fifth light incident surface, a second light guide bar surface away from the fifth light incident surface, and a first light guide bar slope surface located between the first light guide bar surface and the second light guide bar surface, and an inner angle formed between the first light guide bar slope surface and the second light guide bar surface is less than or equal to 90 degrees,
wherein a distance between the first light guide bar surface and the second light guide bar surface is equal to a length difference between the second substrate and the first substrate in a direction perpendicular to the fifth light incident surface.

19. The transparent display panel of claim 18, further comprising a refractive index matching layer arranged on a surface of the light guide plate facing the liquid crystal layer, wherein a refractive index of the refractive index matching layer is less than that of the light guide plate, that of the first substrate and that of the second substrate.

* * * * *